(12) United States Patent
Roulland et al.

(10) Patent No.: US 7,774,198 B2
(45) Date of Patent: Aug. 10, 2010

(54) NAVIGATION SYSTEM FOR TEXT

(75) Inventors: Frederic Roulland, St Nazaire les Eymes (FR); Claude Roux, Grenoble (FR); Stefania Castellani, Meylan (FR); Aaron N. Kaplan, Grenoble (FR); Karin Pettersson, Mariannelund (SE); Antonietta Grasso, Grenole (FR); Jacki O'Neill, Hebden Bridge (GB)

(73) Assignee: Xerox Corporation, Norwalk, CT (US)

( * ) Notice: Subject to any disclaimer, the term of this patent is extended or adjusted under 35 U.S.C. 154(b) by 664 days.

(21) Appl. No.: 11/544,200

(22) Filed: Oct. 6, 2006

(65) Prior Publication Data

US 2008/0091408 A1    Apr. 17, 2008

(51) Int. Cl.
*G06F 17/27* (2006.01)
(52) U.S. Cl. ............ 704/9; 707/765; 707/778; 715/853
(58) Field of Classification Search ............ 704/9; 707/3, 5, 765, 778; 715/853
See application file for complete search history.

(56) References Cited

U.S. PATENT DOCUMENTS

| | | | | |
|---|---|---|---|---|
| 5,301,314 | A * | 4/1994 | Gifford et al. ............ | 707/101 |
| 5,933,822 | A * | 8/1999 | Braden-Harder et al. ....... | 707/5 |
| 6,263,335 | B1 | 7/2001 | Paik et al. | |
| 6,405,162 | B1 | 6/2002 | Segond et al. | |
| 6,498,921 | B1 * | 12/2002 | Ho et al. ............ | 434/362 |
| 6,678,677 | B2 | 1/2004 | Roux et al. | |
| 6,915,300 | B1 | 7/2005 | Roux et al. | |
| 6,947,923 | B2 | 9/2005 | Cha et al. | |
| 6,970,881 | B1 | 11/2005 | Mohan et al. | |
| 6,983,240 | B2 * | 1/2006 | Ait-Mokhtar et al. .......... | 704/9 |
| 7,058,567 | B2 | 6/2006 | Aït-Mokhtar et al. | |
| 2002/0111941 | A1 | 8/2002 | Roux et al. | |

(Continued)

FOREIGN PATENT DOCUMENTS

WO    WO 99/05618    2/1999

(Continued)

OTHER PUBLICATIONS

L.Alamarguy, R.Dieng-Kuntz, C.Faron-Zucker, *Extraction of Lexico-Syntactic Information and Acquisition of Causality Schemas for Text Annotation*, Internet XP019015649, pp. 1180-1186, 2005.

(Continued)

*Primary Examiner*—Talivaldis Ivars Smits
*Assistant Examiner*—Shaun Roberts
(74) *Attorney, Agent, or Firm*—Fay Sharpe LLP

(57) ABSTRACT

A computer retrieval system includes memory which stores instructions for (1) receiving a user query in a natural language, (2) identifying text strings from an associated knowledge base, each containing at least one expression (word or multi-word expression) which is matched with at least one expression of the user query, (3) refining the user query by representing at least a group of the text strings as a navigation tree in which each of a plurality of selectable nodes comprises an expression representative of at least one syntactic unit in at least one of the identified text strings and wherein relationships between syntactic units are used in structuring the nodes of the navigation tree, and (4) retrieving text from the knowledge base related to the refined query. A processor executes the instructions.

25 Claims, 10 Drawing Sheets

U.S. PATENT DOCUMENTS

| | | | |
|---|---|---|---|
| 2003/0217052 A1* | 11/2003 | Rubenczyk et al. | 707/3 |
| 2004/0125403 A1 | 7/2004 | Furst et al. | |
| 2005/0137847 A1 | 6/2005 | Brun et al. | |
| 2005/0138000 A1 | 6/2005 | Roux et al. | |
| 2005/0138556 A1 | 6/2005 | Brun et al. | |
| 2005/0172018 A1 | 8/2005 | Devine et al. | |
| 2005/0267871 A1 | 12/2005 | Marchisio et al. | |
| 2006/0106847 A1* | 5/2006 | Eckardt et al. | 707/101 |
| 2006/0184892 A1* | 8/2006 | Morris | 715/767 |
| 2006/0206474 A1* | 9/2006 | Kapur et al. | 707/5 |

FOREIGN PATENT DOCUMENTS

WO   WO 2004/114163 A2   12/2004

OTHER PUBLICATIONS

Ait-Mokhtar S., Hagege C., Sandor A., *Problemes D'Intersubjectivite dans L'Evaluation des Analyseurs Syntaxiques*, TALN Conference, Batz-sur-mer, France, Jun. 11-14, 2003.

Allan J., *Relevance Feedback with Too Much Data*, Proceedings of the 18$^{th}$ Annual Intl. ACM SIGIR Conference on Research and Development in Information Retrieval, 1995.

Robert C. Berwick, *Parsing by Chunks*, Principle-Based Parsing Computation and Psycholinguistics, pp. 257-278, Kluwer Academic Publishers, Boston, 1991.

David W. Aha, *Supporting Dialogue Inferencing in Conversational Case-Based Reasoning*, Proceedings of EWCBR, 1998.

Hull D., Ait-Mokhtar S., Chuat M., Eisele A., Gaussier E., Grefenstette G., Isabelle P., Samuelsson C. & Segond F., Language Technologies and Patent Search and Classification, *World Patent Information 23*, pp. 265-268, 2001.

D. Carmel, *Automatic Query Refinement Using Lexical Affinities with Maximal Information Gain*, Proceedings of the 25$^{th}$ Annual International ACM SIGIR Conference on Research and Development in Information Retrieval, 2002.

Kalyan Gupta, *A Framework for Incremental Query Formulation in Mixed-Initiative Case-Based Reasoning*, Proc. of ICCBR Mixed-Initiative Case-Based Reasoning Workshop, 2003.

Fredrik V. Jensen, *The SACSO System for Troubleshooting of Printing Systems*, Proceedings of SCAI, pp. 67-79, 2001.

Y. Jing, *An Association Thesaurus for Information Retrieval*, Proceedings of RIAO, 1994.

Byeong H. Kang, *Help Desk System with Intelligent Interface*, Applied Artificial Intelligence, vol. 11, No. 7, pp. 611-631(21), Dec. 1, 1997.

Jacki O'Neill, *Using Real-Life Troubleshooting Interactions to Inform Self-Assistance Design*, Proceedings of INTERACT, Rome, Italy, Sep. 12-16, 2005.

Jacquemin B., Brun C. & Roux C., Enriching a Text by Semantic Disambiguation for Information Extraction, *Conference Proceedings LREC*, Las Palmas, Spain, Jun. 2, 2002.

Kaplan A., Towards a Consistent Logical Framework for Ontological Analysis, *Proc. of the Intl. Conf. on Formal Ontology in Information Systems*, Ogunquit, Maine, Oct. 2001.

J.Oneill, A.Grasso, S.Castellani, P.Tolmie, Using Real-Life Troubleshooting Intaractions to Inform Self-Assistance Design, *IFIP Conference on Human-Computer Interaction*, 2005.

Reiner Kraft, *Mining Anchor Text for Query Refinement*, Proceedings of the 13$^{th}$ International World Wide Web Conference, 2004.

From Factoids to Facts, *The Economist*, pp. 68-69, Aug. 28, 2004.

Alcouffe P., Gacon N., Roux C., Segond F., A Step Toward Semantic Indexing of an Encyclopedic Corpus, *Proceedings of LREC*, Athens, Jul. 2000.

http://www.inxight.com.pdfs/FactExtraction_Web.pdf.

Brun C. & Segond F., *Semantic Encosing of Electronic Documents*, vol. 6 No. 1 of the International Journal of Corpus Linguistics, 2001.

Brun C. & Hagege C., *Intertwining Deep Syntactic Processing and Named Entity Detection*, ESTAL 2004, Alicante, Spain, Oct. 20-22, 2004.

Brun C. & Hagege C., *Normalization and Paraphrasing Using Symbolic Methods*, ACL, Second International Workshop on Paraphrasing, Paraphrase Acquisition and Applications, Sapporo, Japan, Jul. 7-12, 2003.

Hagege C. & Roux C., *Entre Syntaxe et Semantique: Normalisation de la Sortie de L'Analyse Syntaxique en vue de L'Amelioration de L'Extraction D'Information a Partir de Textes*, TALN, Batz-sur-mer, France, Jun. 11-14, 2003.

Richardson S., *Determining Similarity and Inferring Relations in a Lexical Knowledge Base*, PhD. Dissertation, City University of New York, 1997.

Segond F., Schiller A., Grefenstette G. & Chanod J.P., An Experiment in Semantic Tagging Using Hidden Markov Model Tagging, *ACL-EACL Workshop about Lexical Semantics*, Madrid, 1977.

U.S. Appl. No. 11/013,366, filed Dec. 15, 2004, Brun, et al.
U.S. Appl. No. 11/018,758, filed Dec. 21, 2004, Brun, et al.
U.S. Appl. No. 11/018,892, filed Dec. 21, 2004, Brun, et al.
U.S. Appl. No. 11/173,136, filed Dec. 20, 2004, Sándor, et al.
U.S. Appl. No. 11/173,680, filed Dec. 20, 2004, Sándor, et al.
U.S. Appl. No. 11/202,549, filed Aug. 12, 2005, Brun.
U.S. Appl. No. 11/287,170, filed Nov. 23, 2005, Brun, et al.
U.S. Appl. No. 11/341,788, filed Jan. 27, 2006, Segond, et al.
U.S. Appl. No. 11/354,688, filed Feb. 15, 2006, Roulland, et al.

Aït-Mokhtar, et al., Incremental Finite-State Parsing, *Proceedings of Applied Natural Language Processing*, Washington, Apr. 1997.

Aït-Mokhtar, et al., Subject and Object Dependency Extraction Using Finite-State Transducers, *Proceedings ACL'97 Workshop on Information Extraction and the Building of Lexical Semantic Resources for NLP Applications*, Madrid, Jul. 1997.

Aït-Mokhtar, et al., Robustness Beyond Shallowness: Incremental Dependency Parsing, *NLE Journal*, 2002.

Aït-Mokhtar, et al., A Multi-Input Dual-Entry Point Dependency Parser, *Proceedings of Beijing*, IWPT, 2001.

* cited by examiner

Select options:

paper jam

[New Search]

● paper jam (48 hits)   ○ paper (224 hits)   ○ jam (34 hits)

Select Model:  DC265ST ▼

Select your country:  United Kingdom ▼

Select/Deselect Suggested Refinements to find your issue in the list of Matched Problems

| ⋙ Suggested Refinements ⋙ | ⋙ Matched Problems ⋙ 35 of 48 |
|---|---|
| ⊟ All Problems | 1 - Paper Jam in Area 3a |
| ⊟ paper jam | 2 - Clear the Paper Jam in Area 2 Message Displays When Any Paper Tray is Used |
|     in area 6a | ...Excessive moisture can lead to paper jams and copy quality problems... |
|     in area 1 | 3 - Clear the Paper Jam in Area 2 Message. Message Displays When Only One Paper Tray is Used |
|     in area 3b | ...Excessive moisture can lead to paper jams and copy quality problems... |
| ⊞ of the automatic document feeder | 4 - Paper Jam in Areas 1 and 2 When Using Paper Tray 6 |
|     in registration transport | 5 - Paper Jam in Area 7a |
|     in area 7a | 6 - Paper Jam in Tray 6, the High Capacity Feeder (HCF) |
|     in area 3a | 7 - Paper Jam in Area 4 |
|     in areas 1 and 2 when using paper tray 6 | 8 - Paper Jam in Area 3c |
|     in area 3e | 9 - Paper Jam in Area 3e |
| ⊞ in the paper path when feeding | 10 - Paper Jam in Registration Transport |
|     in area 6b the underside of the automatic document feeder | 11 - Paper Jam in Document Feeder Input Area |
|     in tray 5 | 12 - Paper Jam in Area 3b |
|     in paper tray 1, 2, 3, or 4 | 13 - Paper Jam in Paper Tray 1, 2, 3, or 4 |
|     in tray 6 the high capacity feeder (hcf) | 14 - Fuser Exit Jam Fault |
|     in area 4 | ...Excessive moisture can lead to paper jams and copy quality problems... |
|     in area 3c | |
| clear the paper jam in automatic document feeder (adf) message | |
| paper tray misfeed/registration transport paper | |

Select options:
paper jam

Select Model: DC265ST

Select your country: United Kingdom

[New Search]

● paper jam (48 hits)   ○ paper (224 hits)   ○ jam (34 hits)

Select/Deselect Suggested Refinements to find your issue in the list of Matched Problems

Suggested Refinements — Matched Problems — 4 of 48

Suggested Refinements:
- All Problems
- paper jam
  - in area 6a
  - in area 1
  - in area 3b
  - of the automatic document feeder
    - input area
    - (Only)
  - in registration transport
  - in area 7a
  - in area 3a
  - in areas 1 and 2 when using paper tray 6
  - in area 3e
  - in the paper path when feeding
  - in area 6b the underside of the automatic document feeder
  - in tray 5
  - in paper tray 1, 2, 3, or 4
  - in tray 6 the high capacity feeder (hcf)
  - in area 4
  - in area 3c Matched Problems (342):
1 - Paper Jam in Document Feeder Input Area
2 - Clear the Paper Jam in Automatic Document Feeder (ADF) Message
   ...The Document Feeder optical sensor should be cleaned when a paper jam in the ADF is indicated, but no paper is causing the jam....
3 - Paper Jam in Areas 6b, the Underside of the Automatic Document Feeder
4 - How to Clean the Optical Sensor Located Under the Automatic Document Feeder (ADF)
   ...The Document Feeder optical sensor should be cleaned when a paper jam in the ADF is indicated, but no paper is causing the jam....

FIG. 9

NAVIGATION SYSTEM FOR TEXT

CROSS REFERENCE TO RELATED APPLICATIONS

The following copending applications, the disclosures of which are incorporated herein in their entireties by reference, are mentioned:

Application Ser. No. 11/354,688, filed Feb. 15, 2006, entitled NATURAL LANGUAGE PROCESSING FOR DEVELOPING QUERIES, by Frederic Roulland, et al.;

Application Ser. No. 11/173,136, filed Dec. 20, 2004, entitled CONCEPT MATCHING, by Agnes Sándor, et al.;

Application Ser. No. 11/173,680, filed Dec. 20, 2004, entitled CONCEPT MATCHING SYSTEM, by Agnes Sándor, et al.;

Application Ser. No. 11/013,366, filed Dec. 15, 2004, entitled SMART STRING REPLACEMENT, by Caroline Brun, et al.;

Application Ser. No. 11/018,758, filed Dec. 21, 2004, Published Application No. 2006-0136223, entitled BILINGUAL AUTHORING ASSISTANT FOR THE 'TIP OF THE TONGUE' PROBLEM, by Caroline Brun, et al.;

Application Ser. No. 11/018,892, filed Dec. 21, 2004, published Jun. 22, 2006, as Published Application No. 20060136196, entitled BI-DIMENSIONAL REWRITING RULES FOR NATURAL LANGUAGE PROCESSING, by Caroline Brun, et al.;

Application Ser. No. 11/202,549, filed Aug. 12, 2005, entitled DOCUMENT ANONYMIZATION APPARATUS AND METHOD, by Caroline Brun;

Application Ser. No. 11/287,170, filed Nov. 23, 2005, entitled CONTENT-BASED DYNAMIC EMAIL PRIORITIZER, by Caroline Brun, et al.;

Application Ser. No. 11/341,788, filed Jan. 27, 2006, entitled LINGUISTIC USER INTERFACE, by Frederique Segond, et al.

BACKGROUND

The exemplary embodiment relates to the linguistic processing arts. It finds particular application in conjunction with automated natural language processing for use in searching a structured knowledge base, such as a manual, and will be described with particular reference thereto. However, it is to be appreciated that it is also amenable to other like applications.

Many of the devices used today, both within the workplace and outside it, are highly complex. Such devices include computing devices, such as personal computers, image reproduction devices, such as printers and photocopiers, vehicles, and audio and visual equipment, such as cameras, video recorders, cell phones, dictation devices, music systems, and the like. As computing power has increased, so the functionality of these devices has also increased. The added functionality is wasted, however, if users do not know how to use or maintain the device or are unable to locate the necessary information to do so. Suppliers often assist the user by providing various manuals covering, for example, instructions for use, trouble-shooting, and repair. As befits such complex devices, the associated manuals are also by necessity highly complex. Users generally do not need or wish to become familiar with the entire manual, but rather prefer to use it to address specific needs as they arise.

Online manuals offer the opportunity for applying greater search flexibility. However current search mechanisms can often be difficult to use, returning many results which may be irrelevant or missing relevant results. Because manuals and similar searchable electronic knowledge bases tend to use words which are not in common usage, they are difficult to search using conventional searching techniques. Without a good knowledge of the knowledge base content and terminology by the user, searchable knowledge bases often fail to produce effective search results and thus are best suited to experts who are relatively familiar with their content or structure. Manuals also tend to contain common expressions that are repeated in many different contexts. Because current search mechanisms do not factor out recurring expressions, this multiplies the number of results that a user must read through in order to find the most relevant one. Expert system approaches offer more guidance to less experienced users but can be quite rigid and do not offer the flexibility that a more expert user would prefer. Some systems offer a combination of these approaches in order to satisfy the two types of users. However expert system solutions are very expensive to build and maintain.

Decision trees can be used to provide customers with help for the diagnosis of printer systems. This approach specifies the possible troubleshooting sequences as branches of a decision tree. At each branching of the tree, one of the branches will be chosen based on the information provided by the customer at the last step. However, building and maintaining a decision tree that allows for all possible diagnoses is extremely complex, and such a tree can be time-consuming for the customer to navigate.

Internet search engines for general use sometimes use a hierarchy of predefined topics according to which all indexed documents are classified. When combined with a full-text search capability, these topic hierarchies can serve as a query refinement mechanism. When a user's query matches documents in multiple categories, the user may be asked to choose a category before being shown a list of documents. This requires the construction and maintenance of a topic hierarchy, and links from documents into this hierarchy. Documents which a user may consider relevant are often not retrieved because the relevant text may be considered tangential to the main topic of the document. Other search engines cluster the results of the initial search using term occurrence frequencies, and then, for each cluster, present a term representative of that cluster as a refinement choice. This approach relies on the assumption that the document that corresponds to the user's information need is similar, in terms of vocabulary used, to a recognizable class of other documents in the knowledge base. Both of these systems are based on hierarchical classification of documents by topic. The navigable paths, in such systems, have no particular meaning because each selection simply names a smaller, more specific topic than its parent selection.

Another search system is able to extract the most important words of a document and to build an underlying graph representing the number of co-occurrences of these words in the same sentence. This graph is then displayed as a navigation tree where clicking on a branch selects the sentences containing the list of words present in the branch. The selections which may be made are limited to words or expressions identified by their frequency. Words with similar meaning are not considered, nor are the syntactic relationships between words. As a result, relevant documents are often missed and documents which are not particularly relevant may be retrieved because the words they use are very common.

INCORPORATION BY REFERENCE

The following references, the disclosures of which are incorporated by reference herein in their entireties, are mentioned:

U.S. Pat. No. 6,405,162, entitled TYPE-BASED SELECTION OF RULES FOR SEMANTICALLY DISAMBIGUATING WORDS, by Segond, et al., discloses a method of semantically disambiguating words using rules derived from two or more types of information in a corpus which are applicable to words occurring in specified contexts. The method includes obtaining context information about a context in which a semantically ambiguous word occurs in an input text and applying the appropriate rule.

U.S. Pat. No. 6,678,677, entitled APPARATUS AND METHOD FOR INFORMATION RETRIEVAL USING SELF-APPENDING SEMANTIC LATTICE, by Roux, et al., discloses a method for information retrieval using a semantic lattice.

U.S. Pat. No. 6,263,335, entitled INFORMATION EXTRACTION SYSTEM AND METHOD USING CONCEPT-RELATION-CONCEPT (CRC) TRIPLES, by Paik, et al., discloses a system which identifies a predetermined set of relationships involving named entities.

U.S. Pat. No. 7,058,567, issued Jun. 6, 2006, entitled NATURAL LANGUAGE PARSER, by Aït-Mokhtar, et al., discloses a parser for syntactically analyzing an input string of text. The parser applies a plurality of rules which describe syntactic properties of the language of the input string.

U.S. Published Application No. 20050138556, entitled CREATION OF NORMALIZED SUMMARIES USING COMMON DOMAIN MODELS FOR INPUT TEXT ANALYSIS AND OUTPUT TEXT GENERATION, by Brun, et al., discloses a method for generating a reduced body of text from an input text by establishing a domain model of the input text, associating at least one linguistic resource with the domain model, analyzing the input text on the basis of the at least one linguistic resource, and based on a result of the analysis of the input text, generating the body of text on the basis of the at least one linguistic resource.

U.S. Published Application No. 20050138000, entitled Systems and methods for indexing each level of the inner structure of a string over a language having a vocabulary and a grammar, by Roux, et al., discloses methods for indexing and searching the inner structure of a string over a language having a vocabulary and a grammar using bit vectors.

U.S. Published Application No. 20050137847, entitled METHOD AND APPARATUS FOR LANGUAGE LEARNING VIA CONTROLLED TEXT AUTHORING, by Brun, et al., discloses a method for testing a language learner's ability to create semantically coherent grammatical text in a language which includes displaying text in a graphical user interface, selecting from a menu of linguistic choices including at least one grammatically correct linguistic choice and at least one grammatically incorrect linguistic choice, and displaying an error message when a grammatically incorrect linguistic choice is selected.

BRIEF DESCRIPTION

In accordance with one aspect of the exemplary embodiment, a computer retrieval system includes memory which stores instructions including instructions for receiving a user query in a natural language, instructions for identifying text strings from an associated knowledge base stored in associated memory, each of the identified text strings containing at least one expression which is matched in the knowledge base with at least one expression of the user query, instructions for refining the user query comprising instructions for representing at least a group of the text strings as a navigation tree in which each of a plurality of selectable nodes comprises an expression representative of a syntactic unit in at least one of the identified text strings and wherein relationships between syntactic units are used in structuring the nodes of the navigation tree, whereby in navigating the tree, a user selects nodes which refine the query, and instructions for retrieving text from the knowledge base related to the refined query. A processor executes the instructions.

In another aspect, a method for retrieving text strings responsive to a user's query includes inputting a query in a natural language, identifying text strings from a knowledge base, each of the identified text strings comprising at least one expression which is matched in the knowledge base with at least one expression of the user query, representing at least a group of the identified text strings as a navigation tree in which each of a plurality of user-selectable nodes comprises an expression representative of a syntactic unit in at least one of the identified text strings and wherein relationships between syntactic units are used in structuring the nodes of the navigation tree, and retrieving text from the knowledge base related to the nodes selected by a user during navigation of the tree.

In another aspect, a system for retrieving text responsive to a query includes a knowledge base which stores indexed text strings. A graphical user interface is provided for inputting a user query and displaying a navigation tree for user navigation of a group of text strings retrieved from the knowledge base as responsive to the user query. A processor, in communication with the user interface and the knowledge base, which processes the user query and retrieves the text strings from the knowledge base. The processor executes instructions for identifying text strings in the knowledge base wherein each of the identified strings includes at least one expression which matches at least one expression of the user query, the at least one matching expression comprising at least one word and having the same lemma form as an expression in the user query or being indexed in the knowledge base as being a synonym of the at least one expression in the user query, identifying syntactic units in a retrieved text string, representing the identified syntactic units in the form of a navigation tree in which a plurality of nodes are connected to a root node, whereby a pathway from a root node to a terminal node of the connected nodes represents one of the text strings, the nodes of the pathway each representing at least one of the identified syntactic units, and when a user navigates from a root node to a selected one of the connected nodes, displaying text retrieved from the knowledge base which is associated with the pathway.

BRIEF DESCRIPTION OF THE DRAWINGS

FIG. 7 illustrates a subsequent refinement of the query;

FIG. 8 illustrates retrieval of solution statement titles; and

FIG. 9 illustrates retrieval of additional solution statement text.

DETAILED DESCRIPTION

Figure 1:
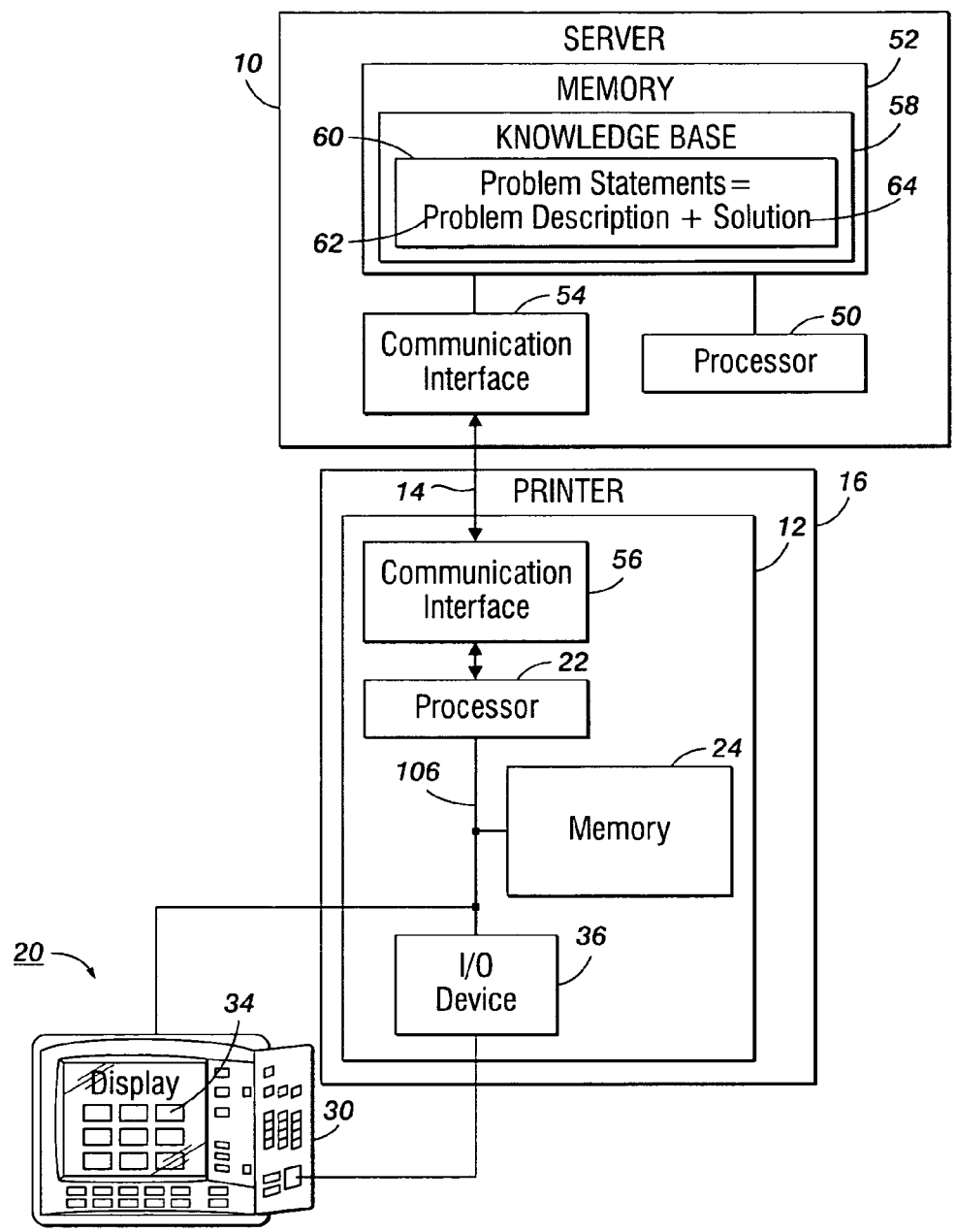
FIG. 1 is a functional block diagram of a retrieval system according to the exemplary embodiment.

In aspects of the exemplary embodiment disclosed herein, a method and a system for navigating electronic knowledge bases, such as manuals, and a method for developing such a system, are provided. The exemplary system and method facilitate user access to the information that the user is seeking to retrieve from the manual. In various aspects, the information is presented to the user as a conceptual navigation tree. Nodes of the tree are computed on the basis of natural language processing (NLP) methods applied to content retrieved from the manual which is identified by the system as being potentially responsive to a user's query. The nodes of the navigation tree may be created and labeled, with paths of the tree corresponding to sentences contained in the manual. The tree links together different sentences sharing common expressions or underlying concepts. The tree may be obtained by first transforming the output of the application of the NLP methods into a graph that links together different sentences sharing some common expressions (e.g., single words or group of words), and then displaying the result as a navigation tree, where the nodes correspond to parts of the content of the manual. Nodes of the tree can be supplemented with information extracted from the manual's contents. The contents of the manual that are related to the search query can be navigated by a user through the conceptual tree.

Briefly, the retrieval method may include five stages which may proceed sequentially in response to a user query, as follows:

1. Extracting some or all of all text strings (e.g., sentences) from the knowledge base that contain expressions matching one or more expressions in the query. Expressions in the knowledge base are considered to be a match either because they are composed of a word or group of words that appear in the query or are linked to the word or group of words via indexing, e.g., they have the same normalized ("lemma") form or are indexed as being a synonym of a query expression (extraction stage).
2. Identifying, within these extracted sentences, the syntactic units that contain expressions which match the expressions in the query. This is made possible through the indexing of syntactic units in the knowledge base based on the words they contain (identification stage).
3. Grouping the retrieved sentences according to the set of query words they match and/or the number of syntactic units in which these words are contained. Groups may be scored (ranked) according to their similarity to the query (grouping stage).
4. If there is no sentence matching all the query words, optionally selecting one of the groups of results matching a sub-part of the query (sub-query selection stage).
5. Creating a navigation tree for the query or selected sub-query which allows a user to navigate the retrieved responses to the query or sub query from a common root node to a terminal node, generally via one or more intermediate nodes. The pathway navigated from the root node to the leaf represents a contiguous part of a sentence and includes one or more nodes, each of which incorporates a linguistically coherent expression which is representative of a syntactic unit in the sentence. A user may also access supplemental information linked in the repository to a selected responsive sentence (navigation tree creation stage).

Stages 1-3 may proceed automatically, without input from the user.

Users generally search for information in an electronic manual through keywords, glossaries, or tables of contents. Typically, manuals, such as operating manuals and repair manuals, which are directed to a particular machine, such as a printer, present some recurrent syntactic structure as well as a specialized vocabulary, which is often described in a glossary. For example, the following set of sentences extracted from a printer troubleshooting reference shows a sort of regularity both in the vocabulary and in the sentence structure:

White lines when printing

White lines when printing and faxing

White lines when copying from the document glass

White lines when making copies from the document feeder

Image area partially blank when printing

Edge of copy partially blank when printing

The exemplary method for navigating the contents of a manual leverages this recurrent syntactic structure and specialized vocabulary. The exemplary embodiment is described with particular reference to troubleshooting, particularly in the context of printers. In the exemplary embodiment, the knowledge base comprises a manual, such as an operating manual and/or repair manual for a device such as a printer although it is to be appreciated that other structured knowledge bases are also contemplated. The exemplary embodiment supplements or replaces conventional searching techniques.

Application Ser. No. 11/354,688 (hereinafter "Roulland, et al.") incorporated by reference, discloses a system and a method for accessing the content of a manual for troubleshooting problems associated with a machine, such as a printer. The present method may employ steps similar to that method (in particular, those steps described generally in stages 1-4, noted above). According to the method presented in Roulland, et al., an index is created by the following process. A parser splits sentences into "syntactic units," which are syntactically self-contained expressions that are appropriate for presentation as refinement choices, such as 'white lines', 'on edge of copy', or 'when printing.' Each word and each syntactic unit is individually indexed, that is they have a distinctive identifier. Syntactic units are indexed based on the words they contain. For each syntactic unit, two strings are stored: the surface form of the syntactic unit as it actually occurs in the sentence, and a canonical ("normalized") form generated by applying some normalization rules. A "concept" is a class of syntactic units that have the same normalized form. All sentences are indexed both on the words and on the underlying concepts they contain. Information is also stored about the relationships between syntactic units in a sentence. These relationships are based on the syntactic dependencies between the syntactic units and on the order the units appear in the sentence. The maintainer of a knowledge base ("corpus") can create synonymy rules, which are used in the creation of the index.

Roulland, et al. also proposes refinement steps for helping a user entering a query to refine his or her problem description for navigating the contents of the manual which may include a sub-query selection step and a disambiguation step.

The exemplary embodiment provides a new refinement method which takes the form of a navigation tree. The refinement method may be used as an alternative to the disambiguation and refinement steps proposed by Roulland et al. to provide the user with a more convenient mechanism for developing a query while retaining many of the advantages of the method of Roulland, et al.

The system and method described herein rely on an indexed corpus which may be generated automatically by a parser. The parser takes as input a text document or extended mark up language (XML) document, or group of documents, such as a manual and breaks each sentence (e.g., each problem statement) to be queried into a set of syntactic units (linguistically coherent expressions). The parser provides this functionality by applying a set of rules, called a grammar, dedicated to a particular natural language such as French, English, or Japanese. A grammar is written in a formal rule language, and describes the word or phrase configurations that the parser tries to recognize. The basic rule set used to parse basic documents in French, English, or Japanese is called the "core grammar."

When a given set of documents present some recurrent patterns which may induce some errors while processing with the core grammar of a given language, such as tables, complex chemical formulae, etc., the linguist can specialize this core grammar by adding rules which are better suited to analyzing these domain-specific strings. The parser may be specifically designed to simplify the process of enriching a core grammar, due to its incremental, step by step application of the rules. New rules are simply appended to the grammar and only executed at the end of the analysis on the regular output of the core grammar.

The relationships between objects of the index may be stored using presence vectors as described, for example, in above-referenced Published Application No. 20050138000, incorporated herein by reference. This reduces the complexity of the indexing.

In various aspects, a unified representation is used for all the extracted information. This involves putting the extracted information from a document or set of documents into one single format. For example, all the extracted information for an input document is stored with the text as an XML document or in a relational database, which can then be queried with queries in a suitable query language, such as XPath instructions or database queries.

With reference to FIG. 1, a functional block diagram of an exemplary computer retrieval system for querying a knowledge base according to the methods described herein is shown. The system includes a server 10 and a user interface 12. The user interface 12 communicates with the server via a computer network 14, such as a local area network (LAN) or wide area network (WAN), or the Internet. The user interface 12 may form a part of a machine 16, such as a printer in the illustrated embodiment, which incorporates a computing device. In another embodiment, the user interface may be a separate computing device. For example, the user interface 12 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like, such as incorporated into a workstation of a computer network or other computer device such as a personal computer or mobile computer device, such as a PDA, a cell phone, a Tablet PC, a Pocket PC, or other suitable electronic device.

The illustrated user interface 12 includes a display 20, such as a screen, a processor 22, and associated memory 24 for storing user queries and instructions to be executed by the processor. The memory 24 may represent any type of computer readable medium such as random access memory (RAM), read only memory (ROM), magnetic disk or tape, optical disk, flash memory, or holographic memory. In one embodiment, the memory 24 comprises a combination of random access memory and read only memory. The components of the interface may all be interconnected by a bus 28. The display 20 serves as a graphical user interface which displays responses to the user's query and displays a navigation tree for developing the query. A user interacts with the user interface 12 by manipulation of an associated user input device 30, such as a text entry device, such as a keyboard, and/or a pointer, such as a mouse, track ball, pen, touch pad, or a touch screen, stylus, or the like. By manipulation of the user input device 30 a user can enter a query as a text string as well as navigate the screens and other features of the graphical user interface, such as one or more of a toolbar, pop-up windows, scrollbars (a graphical slider that can be set to horizontal or vertical positions along its length), menu bars (a list of options, which may be used to initiate actions presented in a horizontal list), drop down menus (a list of options that can be used to present menu sub-options), and other features typically associated with web browsers. In the illustrated embodiment, the user input device includes a keypad 30 for inputting a text string, which may form a part of a user's query and a touch screen 34 associated with the display 20 which communicate with the processor 22 via an input/output device 36.

The external server 10 stores a knowledge base developed as described in greater detail below. The server 10 may be equipped with a processor 50, a memory 52, and a communications interface 54. Memory 52 may represent any type of computer readable medium such as random access memory (RAM), read only memory (ROM), magnetic disk or tape, optical disk, flash memory, or holographic memory. In one embodiment, the memory 54 comprises a combination of random access memory and read only memory. The processor 50 may include a CPU, and controls each of structural modules of the external server 10. The communications interface 54 is connected to the network, and implements transmission and reception of various kinds of data to and from a communication interface 56 of the user interface 12. Various kinds of data received by the communications interface 54 are stored in the memory 52 as well as instructions, which when executed by the processor perform steps of the exemplary method described herein.

Memory 52 or a separate memory, serves as a document repository. The illustrated memory 52 stores a knowledge base or repository 58, which includes an annotated set of text strings which may be retrieved as responsive to a query. In one embodiment, the text strings take the form of defined problem statements 60 each of which includes a problem description 62 and one or more associated solution sequences 64. The problem statements describe problems known to be associated with the machine 16, expressed in natural language. A defined problem description 62 can be a short textual description of a problem that users may experience, e.g., a known problem with a machine. For example, it could be the single sentence which describes a problem. In the case of a printer for example, an exemplary problem description may be "White lines when making copies from the document glass and document feeder." The problem descriptions 62 are linked in the knowledge base 58 to a set of defined solution sequences 64, also expressed in natural language. The solution sequences 64 each comprise a sequence of one or more steps for a user to perform in attempting to solve the problem. A solution sequence may be composed of at least two parts: a title, which basically describes what needs to be done, and a description, which gives step by step instructions to the user to fix the problem. Since a problem identified by a user may have more than one possible root cause, problem statements 60 in the knowledge base may include more than one solution sequence, which may be ordered in a list. Additionally, two or more problem statements may be associated with the same solution. As discussed above, the knowledge base is indexed according to the normalized forms of the words that occur in the problem descriptions 62, and optionally also the solutions 64 or parts thereof, and their synonyms, syntactic units, and underlying concepts. However, it is also contemplated that the text strings may represent other types of information and be linked to other types of information such as instructions for operating or assembling a machine or a description thereof.

The knowledge base 58 may be in the form of a relational database. Alternatively, the problem statements may be stored as hypertext documents, such as extensible markup language (XML) documents, which are annotated with tags, which link the descriptions of the problem statements to the associated solutions.

As will be described in greater detail with reference to FIG. 3, the processor 50 executes instructions for Natural Language Processing (NLP) of a natural language user query that has been input by a user and executes instructions for retrieving responsive text strings 60, such as problem statements, from the memory 52. Each retrieved problem statement contains a match of at least one of the expressions in the query (e.g., the same word (or words) as a query word (or words), a word or words with the same lemma as one or more query word(s), or a synonym of one of the query expressions). The processor also executes instructions for generating less specific versions of the user's query, (e.g., for focusing the query on a subpart of the query), in the event that no problem statement matches the entire query. These instructions may include instructions for generating a navigation tree, based on the retrieved text strings, and instructions for presenting the navigation tree on the user's screen 20, for example in the form of a tree with expandable subtrees.

While the system has been described in terms of a server 10 and a user interface 12 as separate components remote from each other, it is also contemplated that the knowledge base 58 and processor 50 may be incorporated into a single device together with the components of the user interface 12.

Figure 4:
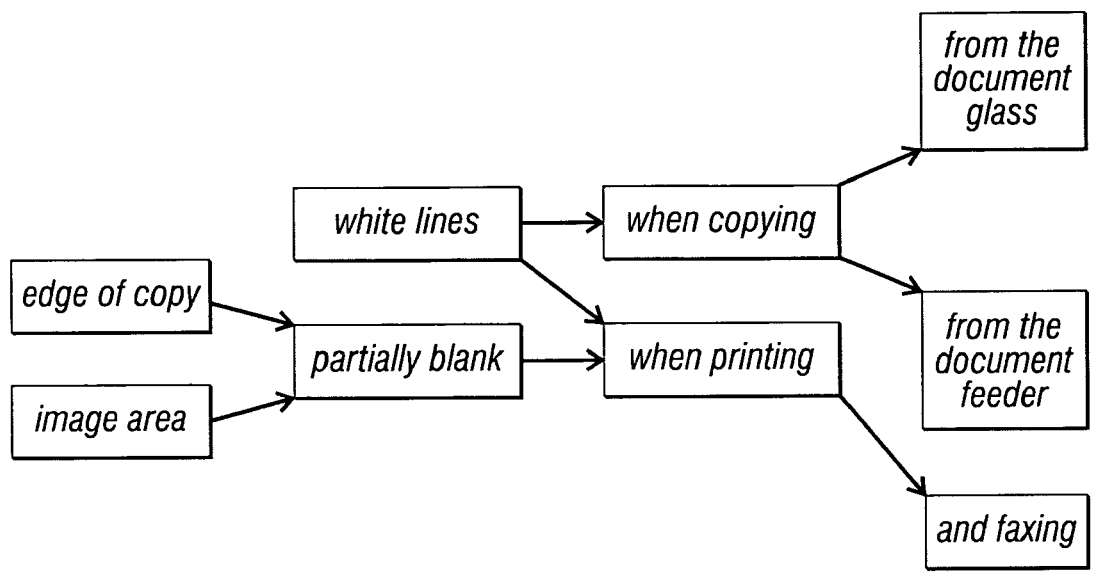
FIG. 4 illustrates query response results modeled as a graph.

An initial indexing of the content of the document repository is generally required, in order to support the dynamic query specification outlined in FIG. 4. This indexing process is specifically designed to store linguistic information. The indexing identifies the syntactic structure of the content of the document repository 58, through the use of the parser.

The indexing may be performed according to the method outlined in Roulland, et al., incorporated by reference. Briefly, a parsing system for annotating and indexing the manual or other document(s) to populate the knowledge base 58 takes as input natural language text, parses the text, and tags (indexes) the document(s). The parsing system can be a general-purpose computer, such as a desktop PC, a laptop PC, a workstation, a server, or a mainframe computer on which parsing instructions are loaded as software or a dedicated processing device. Input documents in electronic form are stored in memory and processed in the manner described below. In the case of a manual, the document(s) may comprise problem descriptions and associated solution sequence(s). The annotation indicates the grammatical structure of the problem statements (problem description and optionally also the associated solution text), allowing for the presentation of linguistically coherent refinement choices in the form of a navigation tree. In general, the parser includes instructions for syntactically, semantically, and lexically analyzing the text content of the problem statements (i.e., the problem descriptions and optionally also the solutions) and identifying relationships between text fragments in the problem statements. The annotated documents are stored, for example in a relational database or as an enriched XML file. The annotated documents comprising the knowledge base 58 can be located in any suitable storage medium, such as a disk, hard drive, Internet server, or the like. Along with XML, other structured formats that include structuring schema or other explicit organization can be used to provide a common structured document format for the annotated documents.

The parser annotates the problem statements 60 with tags (labels). The labels may list synonyms for expressions in the text, delineate syntactic units, and indicate relationships between syntactic units. These tags are used to index the documents in the knowledge base 58. The rules that generate these tags may be based on lexical and syntactic information. Lexical information may include a word's part of speech (e.g. noun or verb) and its lemma (e.g., the lemma of "printing" is "print"). Syntactic information may include dependencies between words, such as the relationship between a subject and its object or the relationship between a verb and its object (e.g., in the phrase "the machine makes noises," there is an OBJECT type of dependency between "make" and "noise").

In some embodiments, the parser comprises an incremental parser, such as the Xerox Incremental Parser (XIP), as described, for example, in above-referenced U.S. Patent Publication No. 20050138556 and U.S. Pat. No. 7,058,567 and in the following references: Aït-Mokhtar, et al., "Incremental Finite-State Parsing," Proceedings of Applied Natural Language Processing, Washington, April 1997; Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997; Aït-Mokhtar, et al., "Robustness Beyond Shallowness: Incremental Dependency Parsing," NLE Journal, 2002; and Aït-Mokhtar, et al., "A Multi-input Dual-Entry Point Dependency Parser," in Proceedings of Beijing, IWPT 2001.

The parser may include several modules for linguistic analysis. Each module works on the input text, and in some cases, uses the annotations generated by one of the other modules, and the results of all the modules are used to annotate the problem statements. Thus, several different grammar rules may eventually be applied to the same problem statement or fragments (such as words, phrases) thereof.

Figure 2:
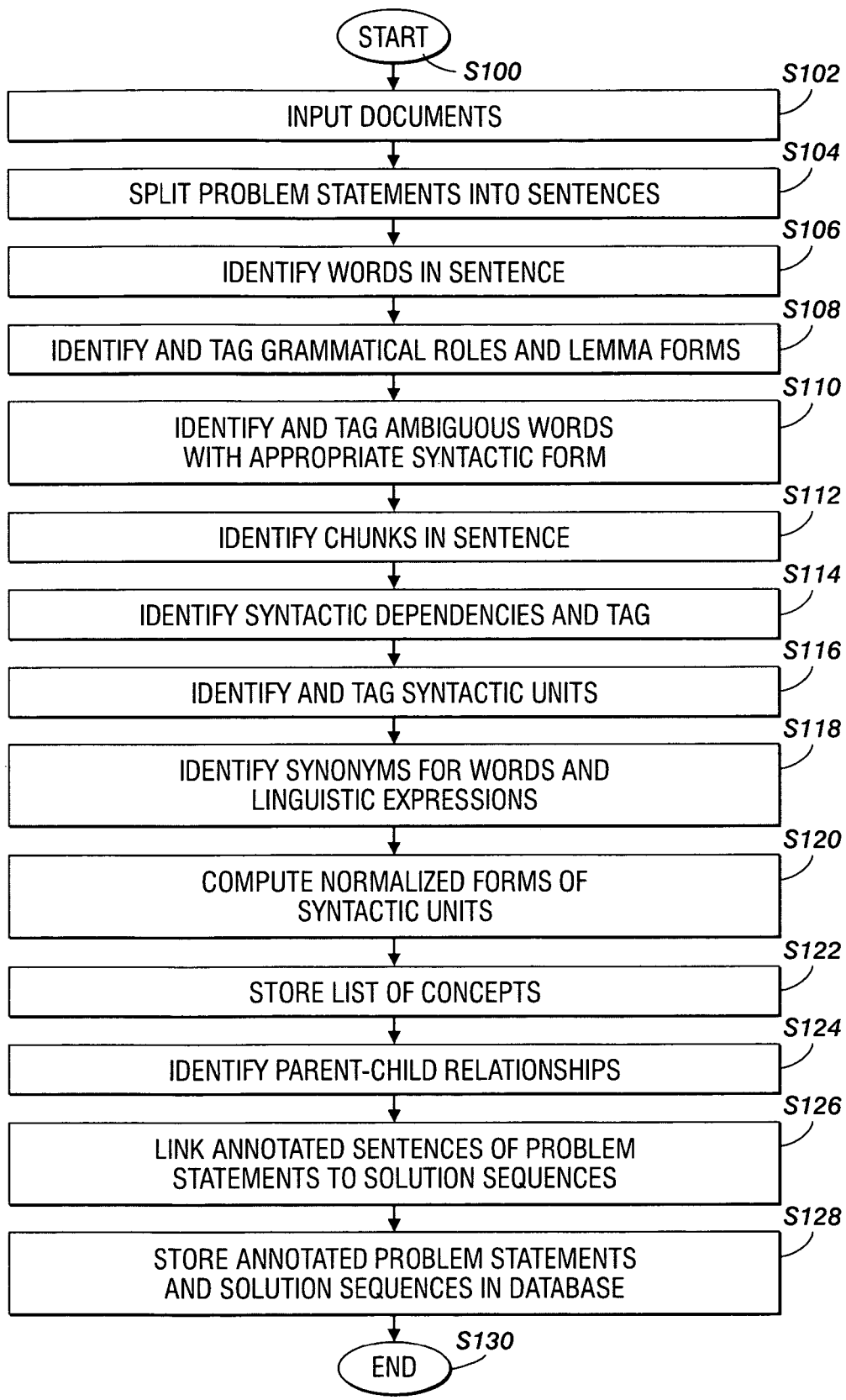
FIG. 2 is a flow diagram of an exemplary method for automated annotation of a knowledge base.

An exemplary method for parsing a document for incorporation into a knowledge base 58 is described with reference to FIG. 2. It will be appreciated that the method may include fewer, more, or additional steps and that the steps need not be performed in the order specified. The method begins at step S100. At step S102, documents to be parsed are input and stored in memory.

For a computer, a document is above all a simple sequence of characters, without any notion what a word or a number is. The first step in parsing is to transform this sequence of characters into a sequence of tokens, where a token is a sub-sequence of characters. A tokenizer module of the parser identifies the tokens in a text string comprising a problem statement, for example, identifying the words, numbers, punctuation, and other recognizable entities in the text string (steps S104 and S106). The result of the tokenizer is an ordered sequence of tokens. Once a document has been transformed into a sequence of tokens, the next step is to analyze the lexical nature of the tokens (S108). The parser, or a morphological module thereof, associates features from a list of features, such as indefinite article, noun, verb, etc., with each recognized word or other text fragment in the document. This module may thus attach tags to a word which identify the grammatical role of the word in the sentence. Some words may have more than one label. For example, the word lines may be a verb and a noun.

The morphological analysis may be performed with finite-state transducers, referred to as lexicons. The lexicon is an automaton which takes as input a token and yields the possible interpretations of that token. The lexicon stores thousands of tokens together with their word forms in a very compact and efficient way. The morphological module may identify lemma forms and/or stems and/or morphological forms of words used in the document and apply tags to the respective words. An index is created that maps each lemma to the set of sentences that contain forms of that word. For example. lines may be indexed as its lemma form line.

In a subsequent step (S110), disambiguating words having more than one meaning may consist of pruning the non-relevant categories for ambiguous words, as described, for example, in U.S. Pat. No. 6,405,162, incorporated herein by reference in its entirety. Disambiguation may include rule-based and/or statistical methods, such as the Hidden Markov Model (HMM), which has been trained on large corpora. The result of this training is stored in a specific file which typically comprises sequences of from two to five categories, for which disambiguation is provided. For example, the sequence Determiner, Noun is very common in English, while the sequence Determiner, Verb is rare. The training consists in storing the frequencies of all these sequences which may be found in corpora to apply to sequences of words later on. Due to this information, the sequence the lines can be correctly analyzed as being a sequence of a determiner (the) followed by a noun (lines). The word lines is then simplified to its noun value and tagged with the appropriate lexical form.

The next step (S112), "chunking," groups words around a head. A head may be a noun, a verb, an adjective, or a preposition. Around these categories, the other minor categories, such as determiner, adverb, pronoun, etc., are lumped.

Syntactic dependencies are then identified between chunks, such as subject (a dependency between a verb chunk and a noun chunk in which the noun chunk is identified as the subject of the verb chunk), object (a dependency between a verb chunk and a noun chunk in which the noun chunk is identified as the object of the verb chunk), prepositional modification (a dependency between a verb chunk or a noun chunk and a prepositional phrase chunk), or other dependencies (S114). The next step is to break each sentence into syntactic units (S116). These are identified on the basis of the information provided by the previous steps. As noted above, a syntactic unit is generally a self-contained expression that is appropriate for presentation to the user as a refinement choice. In general, a syntactic unit is a sequence of words in the same sentence which are grammatically related. For English, syntactic units may be identified according to the following rules:

A noun phrase (NP), prepositional phrase (PP), adverbial phrase (ADVP), or adjectival phrase (AP) chunk is a unit unless subsumed by a larger unit. For example, the NP "the printer" can be a unit itself when it appears as the subject of a sentence, but when it appears within the PP "of the printer," the PP is a unit and the NP is not.

A finite verb plus any associated auxiliary verbs, infinitive verbs, and adverbs constitute a syntactic unit. If the verb has a direct object, then the object NP is also included in the verbal unit. If the verb is a form of "be," then the following predicate (NP or AP) is also included in the unit. For example, the verbal syntactic unit in each of the following sentences is underlined:

The printer breaks.
The printer does not respond.
The printer uses too much toner
The printer is broken.

Syntactic units may appear in contiguous or non contiguous form in a sentence. For example, in the problem statement: "white lines when using the document feeder and the glass," two verbal syntactic units can be identified: "when using the document feeder," and "when using the glass." A syntactic unit may include as few as one word where there are no other words in the same noun phrase, prepositional phrase, adverbial phrase, or adjectival phrase (e.g., "breaks" in the first example above).

Synonyms are then identified and tags attached to words or multi-word expressions corresponding to acceptable lexical equivalents for the expressions (S118). The lexical equivalents may be retrieved from lexical resources stored in memory or retrieved from an outside knowledge base, e.g., via the internet. Most users are non-technical people who may use a terminology which is different from that of the problem statements stored in the knowledge base, and even technically sophisticated users might express a single concept using a range of different expressions. Synonymy rules may take into account not only the words that occur in the text but also the lexical and syntactic structure identified in earlier stages of processing. As will be appreciated, this step may precede the identification of syntactic units.

The maintainer of a knowledge base ("corpus") can create synonymy rules, which are used in the creation of the index in two ways:

(1) by enrichment of the corpus so that user queries with words unknown in the knowledge base can be matched to synonymous words or multi-word expressions that are found in the knowledge base. These additional words are added within the index and linked with the sentences where the synonymy applies as if they were actually present in the sentence;

(2) by the normalization of the corpus so that syntactic units present in different sentences and having the same meaning but using a different wording can be grouped together. A synonymy rule is used to create a normalized form for the syntactic units that is unique across the instances where it applies.

Two types of synonymy rule can be generated. The first type of rule is a strict synonymy that applies without any ambiguity, meaning that each expression can be interchanged with the other, and both can be represented by a common normalized form. These synonymies are thus applied both for enrichment and normalization. This rule may be applied for expressions like 'making copies' and 'copying'. The second type of synonymy is a looser one where each expression can be an interpretation of the concept, but is not interchangeable with another one. This type of synonymy rule is used for expressions that could possibly be considered synonyms for a user, e.g., in some situations where a user describes a page as 'patchy,' that user might consider 'partially blank' to be a good description of the same problem. In this case, the synonymy is used only for enrichment in order to link imprecise user terminology with several possible alternative interpretations in the knowledge base but each expression has a distinct normalized form. As another example, the word "page" may be listed as synonymous with "sheet" in all contexts, whereas the word "change" may be listed as synonymous with "replace" only when the direct object is "cartridge." This rule would apply to the sentence "change the cartridge" but not to the sentence "change the settings." In this case, each representation will have its own normalized form and each one will be represented by its own node in the refinement.

The parser, or a module thereof, may therefore apply the synonymy rules, yielding additional terms by which the documents can be indexed, and allowing the construction of links between syntactic units in different sentences that are synonymous. Synonymy rules may take into account information provided by the previous modules in order to make synonym introduction context-dependent.

The canonical (normalized) form of each syntactic unit is computed by the parser (S120). The syntactic units are tagged according to their normalized form. Syntactic units are mapped to a canonical form so that units that are close in meaning but different in surface form can be grouped together as a single refinement choice. Exemplary rules for normalization are as follows: determiners, forms of the verb "be," and auxiliaries other than "can" are removed from the problem statement; each of the remaining words is replaced by its lemma followed by its part of speech. For example, the normalized forms of three expressions are shown below:

| Surface Form | Normalized Form |
|---|---|
| printers | printer NOUN |
| were not responding | not ADV respond VERB |
| on copies | copy NOUN |

A list of "concepts" includes in the sentence is then stored (S122). A concept is an equivalence class of syntactic units. Two syntactic units belong to the same concept if they have the same normalized form, which indicates that the units are synonymous, or that each is a paraphrase of the other. For example, for the sentence: "White lines when making copies from the document glass and the document feeder," the parser identifies the syntactic units: "white lines," "when making copies," "from the document glass," and "from the document feeder" and indexes the sentence according to their corresponding concepts: white ADJ line NOUN; copy VERB; document NOUN glass NOUN; document NOUN feeder NOUN.

The parser or a module thereof then applies rules for determining parent-child relationships between syntactic units (S124). Various methods are available for determining the parent-child relationships between syntactic units. In one embodiment, a linear strategy is used that consists of making each unit the parent of the unit that follows it. In another embodiment, parent-child relationships are based on the syntactic structure of the sentence in which they appear. For example, if the head of syntactic unit A is syntactically dependent on the head of syntactic unit B, then A is tagged as a child of B. In cases where the dependency graph identified by the parser is not fully connected, links may be added using the linear strategy to join the disconnected subgraphs. For example, for the sequence: [printer] [malfunctions] [when printing] [from Windows] the dependency strategy would be equivalent to the linear strategy. However, for the sequence: [how to print] [from a workstation] [over netbeui], both [from a workstation] and [over netbeui] would be children of [how to print], assuming that the parser correctly determines that both PPs modify the verb. When the parser yields multiple possible attachments for a single unit, each attachment may be transformed into parent-child links, so the parent-child graph is not necessarily a tree.

For example, for the sentence: "White lines when making copies from the document glass and the document feeder," the parser may identify the following parent/child relationships:
"white lines"→"when copying"
"when copying"→"from document glass"
"when copying"→"from document feeder"

In the exemplary method of retrieval described below, these relationships may be presented as a tree structure for navigation where the syntactic units form the nodes and the parent child relationships define the links between the nodes.

The annotated sentences of the problem descriptions are linked to the corresponding solution sequences (S126). The annotated sentences are stored in the database, along with tags indicating the lemmas of the words of the sentence, the lemmas of any synonyms detected, the extent of the syntactic units identified, and the parent-child links among these syntactic units (S128). The method ends at step S130.

It will be appreciated that some of the steps of the method may be recursive. Additionally, the parser may identify other information from the text strings than that specifically listed herein. While the above description refers particularly to the annotation of troubleshooting documents, it will be appreciated that the system may be used for other documents which are to form a searchable corpus.

The parser may include a rule compiler which allows a knowledge base administrator to add lexical entries or to add rules to the parser or modify existing rules. The administrator can create as many rules as needed, which can then be accumulated into a specific file. When the parser instructions are launched on a set of documents, these specific grammar files are loaded together with the basic grammar kernel, and the rules they contain are applied to the text at the end of the regular analysis.

In one embodiment, a computer program product may store parsing instructions which when executed by a computer parses documents for storing in the knowledge base. The computer program product may be a tangible computer-readable recording medium such as a disk, computer chip, or other tangible electronic storage medium, having a computer readable program code recorded thereon. Or, the computer program product may be a transmittable carrier wave in which the control program is embodied as a data signal, or may be a combination of tangible and intangible media.

As will be appreciated, the parsing of document(s) forming the knowledge base 58 may be performed prior to a user submitting a query. Since the annotation process may take some time, it is desirable for the documents to be analyzed prior to entering a query. Additionally it allows the more computationally time consuming steps to be performed by a computer with a large processing capability, whereas the retrieval may be performed by a processor 50 with a much smaller processing capability. However, it is also contemplated that the documents may be annotated after submission of the query and may be annotated by the processor 50 that performs the retrieval.

During a troubleshooting session, for example, a user can incrementally specify a formulation of the problem with a query in the user's own natural language (English in the illustrated embodiment). It is to be appreciated that the method may include fewer or more steps than those illustrated and that the steps need not be executed in the order described.

Figure 3A:
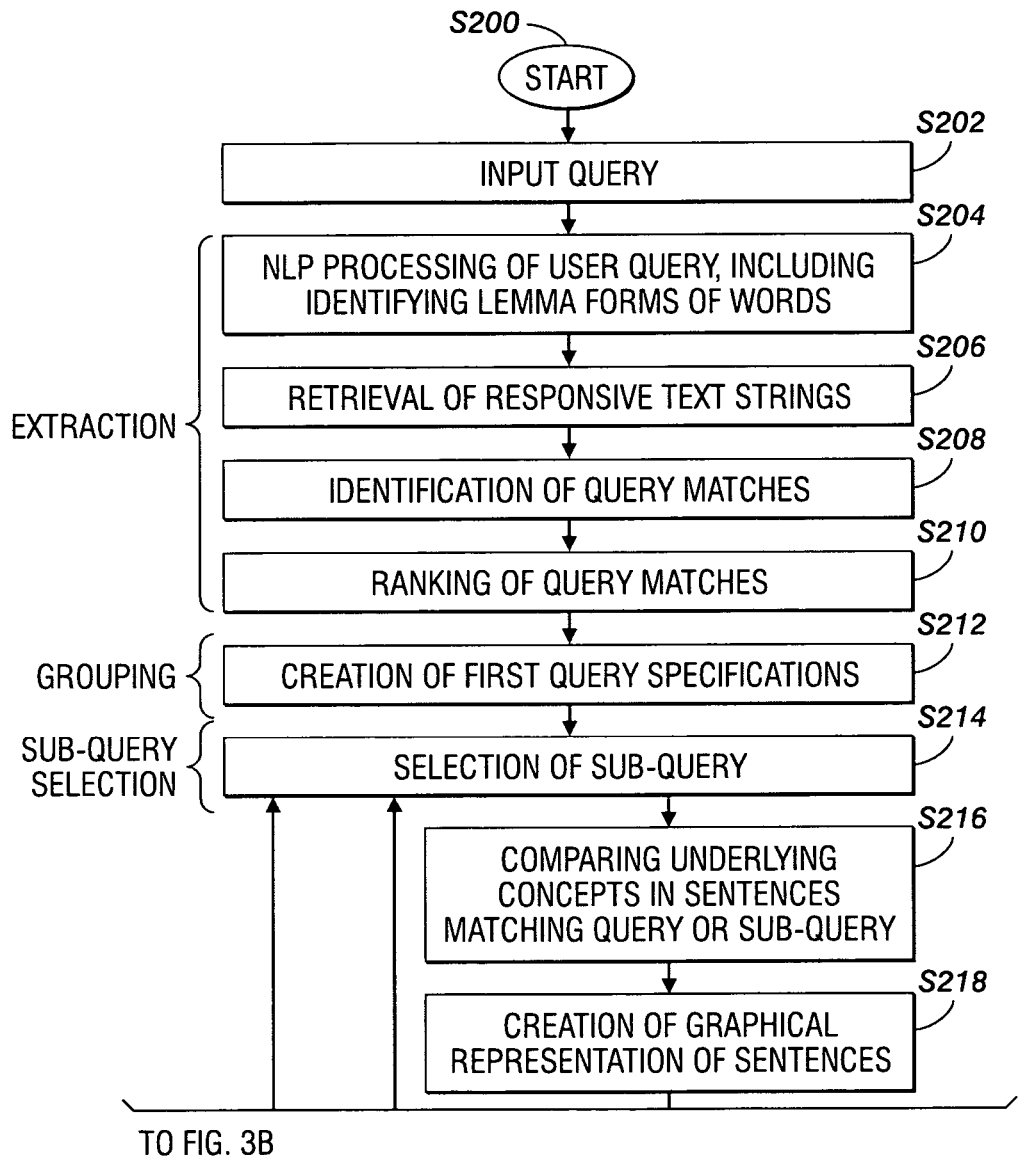
FIG. 3 is a flow diagram of an exemplary method for retrieving documents responsive to a query, which have been indexed by the method of FIG. 2.
Figure 3B:
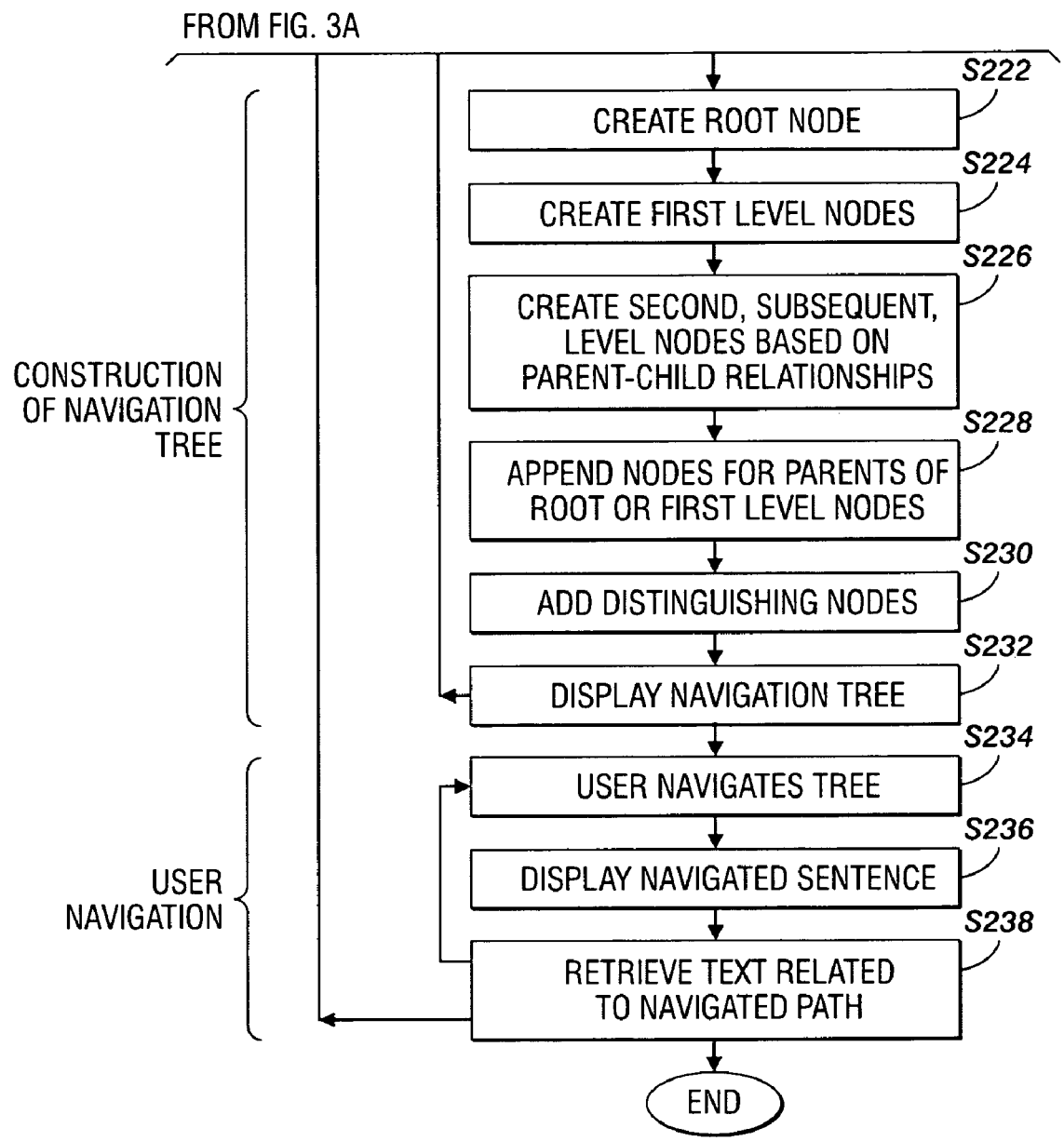

With reference now to FIG. 3, steps of an exemplary method for retrieval of solutions to problems identified through a user query from a knowledge base formed as described above are illustrated. The method begins at step S200 when a user identifies a problem with the machine 16 (or identifies some other information which the user may seek from the knowledge base) and expresses the problem as a query. At step S202, the user inputs a query. In one embodiment, the user may enter keywords, such as a word or sequence of words, via the user interface 12. The user specifies a formulation of the problem to troubleshoot as a user query in his or her own language. An example of such a formulation could be the query: lines on the page. Or, the user may query the knowledge base by following a predefined structure such as a table of contents or a glossary. The input query, comprising user selected keywords or words selected from the predefined structure or both, is communicated to the server 10.

Stage 1: Extraction

In the extraction stage, the server processor 50 performs a first search of the knowledge base using the user query. The extraction stage may include natural language processing of the query and identifying matching sentences in the knowledge base which match one or more words of the users query and may further include various ranking or ordering steps designed to identify the most responsive sentences. This stage may include the following steps: natural language processing (NLP) of the query (step S204), retrieval of responsive results (e.g., sentences, such as problem descriptions) (step S206), identification of query matches (step S208), and ranking of query matches (step S210).

The NLP step (S204) may include extracting, from the input string, text fragments, such as words, to search in a similar manner to that described in steps S104-S110 described above. The query entered by the user is lemmatized into a list of lemmas. In the case of the lines on the page query, the list of words will be: line, on, the, page.

In the retrieval step (S206), the server processor 50 retrieves all the text strings (e.g., sentences) that match at least one expression (e.g., word) of the query in their text or enriched corpus (e.g., text strings which include words with the same lemma as a query word or one of its synonyms—i.e., an equivalent normalized form) from the knowledge base 58. The responses may comprise problem statements in the form of text strings. The number of responses may be displayed on the user interface display 20. These text strings may be retained in memory 52, rather than being transmitted to the user interface, and constitute the initial set of results. Each problem statement 60 becomes one search result.

The identification of query matches (step S208) may include, for each matching sentence, the following steps: For each word of the query which did not match previously, the processor 52 looks for the concepts in the sentence comprising this word. If a concept is found, the processor determines if this concept contains other words from the query. The concept is stored together with the query words it matches. Query match objects are created from the list of detected matching concepts. All the matching concepts that are linked together by a parent/child dependency are grouped in the same query match. A query match is therefore a list of concepts linked together and matching words from the user query. At the end of this step, each matching sentence is associated with one or more query match objects.

In the ranking of the query matches (step S210), the query matches identified in step S208 may be ranked according to predetermined criteria. Exemplary criteria include:

The higher the number of query words matching the query match, the better (higher) the query match is ranked. In other words, query matches that include the largest number of words from the user query are favored.

For query matches comprising the same number of query words, the lower the number of concepts contained in a query match, the better (higher) the query match is ranked. This accounts for the probability that query matches that comprise some words from the user query in a very short/compact description are more precise.

A ranking which employs a weighting of these two criteria may be employed. For example, using the two criteria, query matches can be ranked such that two of them are equally ranked only if they comprise the same number of words from the user query and comprise the same number of concepts.

Finally the result problem statements are sorted in descending order according to their score. No additional threshold needs to be applied to the problem statements with lowest score since a subsequent refinement process reduces this initial list of results. The resulting problem statement ranking enables the user to see the most relevant problem descriptions on top of the list even in the first steps of the refinements when a lot of problem statements are potentially matching the user's query description.

Stage 2: Grouping

This stage may include the creation of the first query specifications (step S212). In general, each query match is used to create a first query specification, which is a tree where nodes represent concepts. Each concept from the query match is translated into a node and the child/parent relationships between the concepts can be used to link these nodes accordingly. When two query matches match the same subset of query words and are equally ranked (e.g., the words that match the user query are contained in the same number of concepts), the processor may merge them into a common query specification. In general, for each set of responsive sentences which are grouped to form a query specification, all responsive sentences have at least one word in common (either as the word itself, a word with the same lemma form, or a synonym of the word). More typically, the responsive sentences in a group with have a set of words in common.

As an example, illustrated in FIG. 4, for the user query: "lines on the page," one possible query match may contain only the concept "white lines," which includes the word "line" from the user query, and another query match may only contain the concept "for the telephone line," which also includes the word "line." Since they share the user query word "line," the two query matches can be merged into a query specification composed of two branching nodes where the two alternatives are "white lines" and "for the telephone line." Later on in the process, the user will be able to choose among them during the navigation stage.

This example illustrates a merge of two query matches with one single concept, but the same operation can apply to query matches containing several matching concepts. Merging is possible if a concept from one of the query matches can be merged with one concept from the other one. At the end of this phase, all the query matches have been transformed into potential initial query specifications.

The query specification may be modeled as a tree where nodes represent concepts. Where there are no complete matches for the query phrase, the processor may identify one or more query matches which are structured under the concepts they include—lines and page, in the above example. Some of the concepts are multiple choice nodes because they include more than one query match. Some concepts may lead to sub-concepts or refinement choices.

Stage 4: Sub-Query Selection

If the grouping stage (step S212) results in more than one first query specification, i.e., if there is more than one problem statement which is at least partially, but not fully responsive to the query, a sub-query corresponding to one of the query specifications is selected (S214). This step is initiated when the query of the user cannot be entirely matched with the indexed content, but sub-parts of the query can be matched. In one embodiment, the user may be prompted to select a sub-part of the query. For example, if the initialization phase leads to several query specifications issued from query matches that are equally ranked, the system proposes that the user continues the specification of the query using only one of the sub-parts of his or her initial query. If accepted by the user, the method moves to the navigation stage. In another embodiment, an automatic sub-query selection may be presented to the user, based on the ranking(s) of the query matches that make up the query specifications.

Where a sub-query is ranked more highly than the other ones, the system may automatically select this one and this step may be subsumed into the navigation tree creation step.

Stage 5: Construction of Navigation Tree

The exemplary embodiment allows the user to explore the manual via a refinement tree (a navigation tree). The navigation tree provides a means for disambiguation and refinement of the user query while providing a synthetic representation in order to navigate within the list of matching sentences. The navigation tree starts with a group of retrieved sentences which have at least one matching word, syntactic unit, and/or underlying concept in common.

At step S216 concepts that the retrieved sentences in the group have in common are identified by comparing the normalized forms of the sentences' syntactic units. A graph may then be generated in which each node represents a concept and edges represent syntactic relationships (parent/child relationships) between the syntactic units (S218). Where two sentences have the same underlying concept, a node common to both sentences which represents the underlying concept is created. FIG. 4 illustrates an exemplary graph. In this example, the user has entered the query keyword 'patchy.' In the index, the word 'patchy' has been defined as a potential synonym for 'white lines' and 'partially blank'. The illustrated sentences forming the group illustrated by the graph all include concepts which are indexed as being synonymous with "patchy."

Figure 5:
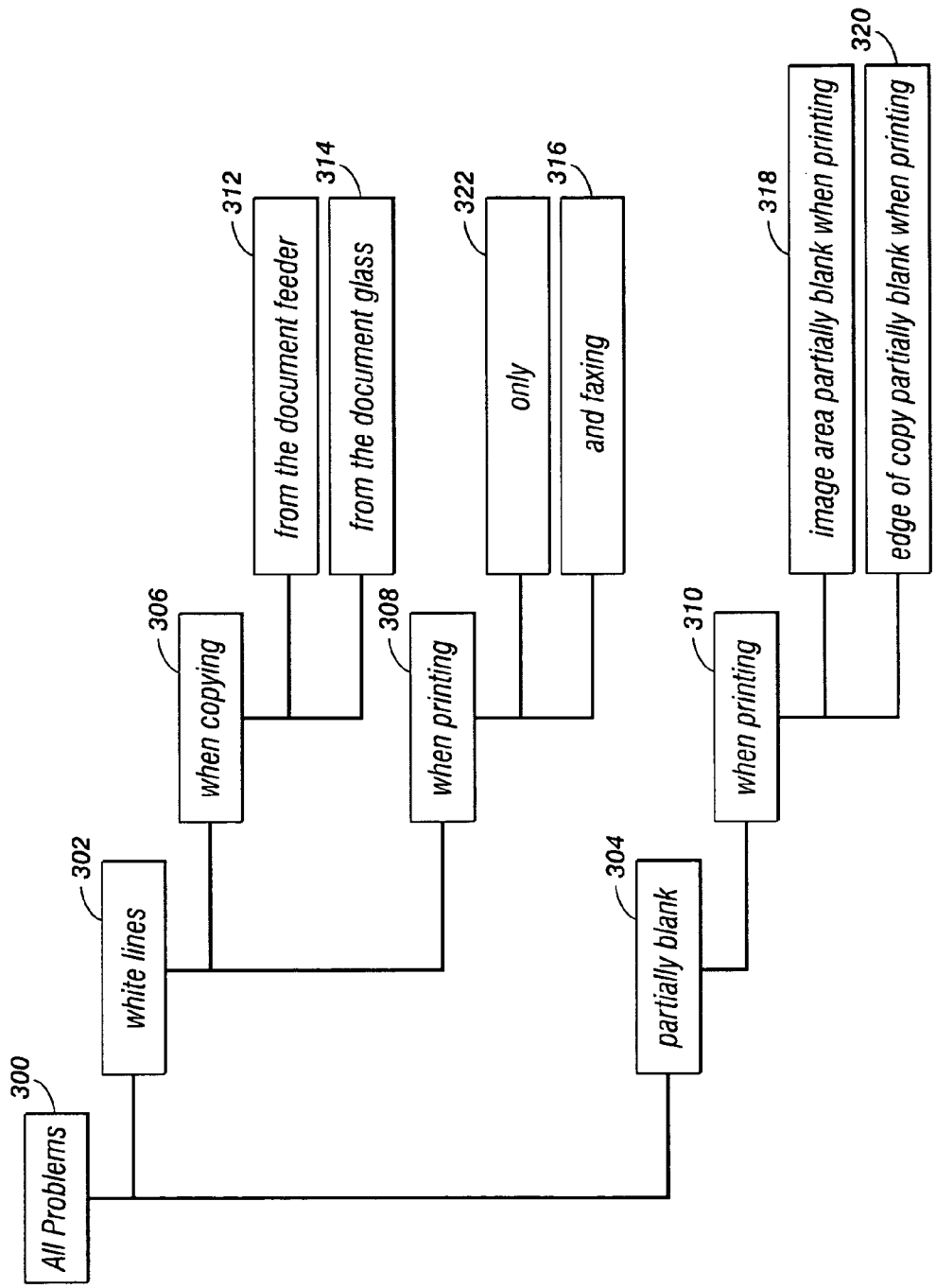
FIG. 5 illustrates a graphical user interface displaying a navigation tree during an initial refinement of a user query.

At steps S222-S230, the graph for the selected sub-query is translated into a navigation tree (FIG. 5). In general, the process involves transforming the graph into a tree having a root node with branches which form navigable pathways from a root node to connecting nodes and ultimately to a terminal node. The root node and any connecting node branching therefrom (intermediate nodes) will have at least two child nodes, and so on until the branch terminates in a leaf node. For ease of navigation, the concept(s) associated with each node may each be represented by a linguistically coherent expression, generally the surface form of the syntactic unit in the sentence represented, rather than the normalized form. Where the syntactic units of the retrieved sentences have different surface forms for the same concept which links them, one of the surface forms may be selected, at least temporarily, for presentation as the linguistically coherent expression (e.g., two sentences which include the surface forms "when copying" and "when making copies," respectively, may both be displayed as "when copying" until the respective path is explored).

The transformation of the graph into a navigation tree may be performed as a four-step process. First, at step S222, a node 300 is created as the root of the tree that will represent the possibility to select all sentences that match the query or sub-query keyword(s). The first level of child nodes are then created (nodes 302 and 304) (step S224). The content of this first level depends on the keywords chosen by the user. The nodes in this level are generally all representative of concepts that match some of the query keywords. A concept may be considered to match a keyword if at least one of the syntactic units corresponding to that concept contains the keyword (either as the keyword itself or its lemma form, or a synonym stored in the index). Using the graph of FIG. 4 as an example, where the keyword "patchy" represents the root, the nodes 'white lines' and 'partially blank' are selected as the first level nodes 302, 304 and are attached to the root. Neither of these concepts includes any of the actual query words but are indexed thereto as being synonymous.

When the query keywords are matched within a sentence over multiple concepts, the first level node may contain only one of these matching concepts. For example, the node attached to the root may be the concept corresponding to the leftmost of the matching syntactic units in the sentence. Other matching concepts may be subsequently attached to the tree as a branch from this node. For example, if the keywords in the query are 'patchy' and 'copy', the tree may have 'white lines' at the first level of the tree and 'when copying' at the second level, just as shown in FIG. 5. In cases where a concept common to two or more retrieved sentences in the group is leftmost in one sentence and in a different position in another sentence, the word order of the query may be adopted as the canonical ordering.

Once the concepts matching the words of the user query have been added to the tree, additional concepts in the query specification which do not match the user query words are then added. For example, at step S226, each additional concept or set of concepts which is a child of one of the nodes already in the tree is represented by a specific branch of the tree (see nodes 306, 308, 310). A child concept may relate to a parent concept in the same way as a child syntactic unit relates to its parent syntactic unit. These branches (or the root node where only one concept is common over all sentences) are then extended by recursively attaching, as new nodes 312, 314, 316 concepts linked to the ones in the tree that appear to the right in the sentence.

At step S228, the branches are extended recursively with nodes 318, 320 representing concepts that appear in the sentences to the left of those already in the tree (e.g., concepts which represent syntactic units which are parents of first level nodes 300, 302, 304).

The tree is thus structured to respect the parent-child relationships between syntactic units, generally by linking a node representing a parent syntactic unit directly to node(s) representing its child syntactic unit(s), where possible.

Not all the possible expansions of the tree that could be generated from the graph are necessarily created. In general, a possible expansion is added in the tree only if the branch it creates represents a sequence of concepts that exists within at least one of the originally matching sentences. Thus, if the collection consists of the two sentences ABC and BD, where A, B, C, and D represent concepts, then there is a path A-B-D in the graph, but a refinement tree generated for A will not contain D, because no sentence contains both A and D.

To limit the tree and to facilitate the choices between branches, the branches may be collapsed into a single node if only one single sub-branch is available.

When the tree has been completely constructed, for each leaf, the path from the root to the leaf represents at least one of the sentences that match the user keywords. However, there may be some cases where a sentence cannot be distinguished from similar sentences by its own leaf. For example in the case of the two sentences "White lines when printing" and "White lines when printing and faxing," the path for the first sentence is a sub-path of the path for the second one in the tree. In such cases a distinguishing node 322, such as the node labeled "only" is added to enable the selection of the first sentence independently from the second one (step S230). Thus, the terminal node for any path may either be a leaf node representing one of the concepts in the sentence, or an artificial node, added for distinguishing purposes.

At step S232, the tree is displayed on the graphical user interface in a manner which enables a user to select nodes and navigate the tree along a selected pathway.

Figure 6:
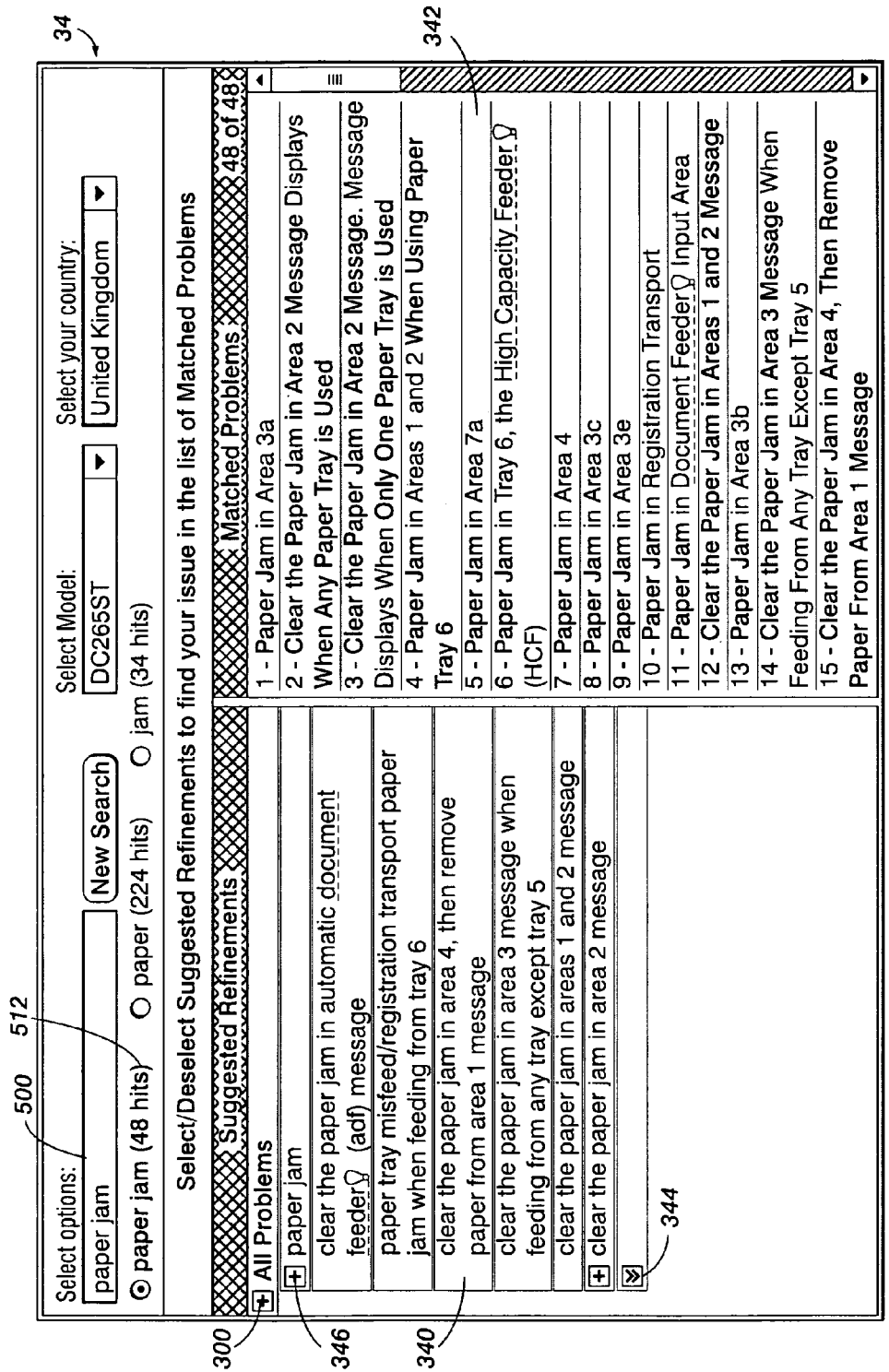
FIG. 6 illustrates expanding the navigation tree in the graphical user interface of FIG. 5.

FIG. 6 shows an exemplary navigation tree presented to a user on the graphical user interface in which the root node (all problems) and some of the child nodes (paper jam) are displayed in a collapsible sublist 340. A results list area 342 lists the top ranked problems retrieved, based on the node(s) of the tree which have been selected. In the navigation tree presented to the user, refinement choices may be presented in an order corresponding to the degree to which the processor 50 determines them to be responsive to the search. In general, sentences retrieved which correspond to the problem description (or more generally, to the title of the retrieved information) are ranked more highly than sentences corresponding to the solution text (or more generally, the information associated with the title). Thus, the order presented to the user reflects this ranking. For example, the refinement choices related to problem description sentences may be displayed in top to bottom order in a scrollable list on the screen while refinement choices which are only related to solution text are hidden but may be accessed via a suitable reveal icon 344, e.g., of the type generally associated with "more."

Stage 6: User Navigation

At step S234, the user can use the tree to navigate through the contents of the manual by following a pathway from a root node via one or more connected nodes. When the user clicks on a node, the effect is to select sentences that contain all of the concepts on the path from the root to the selected node. For example, if the user clicks on the node "when copying" of the tree displayed in FIG. 5, all the sentences containing both "white lines" and "when copying" (including sentences whose syntactic units are represented by the same underlying concept) will be selected.

The tree may be displayed as an expandable list. A user can select one node, view the nodes available for further selection and continue by further selection. If the user finds none of the choices are of particular interest, the user can collapse the tree back to one of the higher up nodes, and repeat the process with different selections. For example, as illustrated in FIG. 6, expandable nodes 346 are identified by a +.

The processor 50 may display the actual sentences matching the path navigated so far (Step S236). This is useful to indicate clearly the link between the search and the results, particularly in cases where the user's search terms are not in the problem description. The processor may then retrieve additional information from the knowledge base which is associated with the sentence corresponding to the path from the root to the leaf (Step S238). Various elements of the text may be returned according to the organization of the manual. In the case of the printer manual described, the content is organized into problems and solutions and it is these that are returned by the search. However, other aspects of the structure of the document could be used to return useful information, for example, section headings along with the sentence containing the search terms. Since manuals tend to be highly structured documents such information provides the user with additional cues to locate the right information.

The troubleshooting system may include other forms of query refinement: for a few large categories of problem statements (e.g., those relating to image quality problems). For example, the system may include a number of hard-coded questions (e.g., "when does the problem occur? When printing/when copying/when faxing"). Additionally, prior to specifying the query, the user may be asked to select a model number of the device, query language, or provide other information which allows the processor to retrieve responsive text from an appropriate manual or part thereof.

While the exemplary method has been described with respect to a troubleshooting method, it is to be appreciated that the method may also be employed to retrieve text strings, such as sentences, from an indexed corpus which are responsive to a user's natural language query.

In one embodiment, a computer program product may store parsing instructions which when executed by a computer such as the processor 50 and/or processor 22, performs the method described herein. The computer program product may be a tangible computer-readable recording medium such as a disk, computer chip, or other electronic storage medium, having a computer readable program code recorded thereon. Or, the computer program product may be a transmittable carrier wave in which the control program is embodied as a data signal, or a combination of tangible and intangible media. In one embodiment, a computer program product suitable for supplying to a user of the system includes instructions for only those steps performed on the user interface by processor 22. Instructions for processor 50 may be supplied to a creator of the knowledge base 58, such as the manufacturer or distributor of the device 16.

The exemplary computer system and retrieval method have advantages over conventional systems used by search engines. In the exemplary embodiment described herein, the path from the root to a leaf constitutes a sentence. In progressing through the tree, the user builds up a more and more detailed problem description. The user may make finegrained choices based on a specific sentence from each candidate document, rather than choosing a topic based on the entire set of terms present in each candidate. The technique is particularly tailored to domains such as troubleshooting where the number of documents to be explored is relatively small (compared to the domain of the web, where a search can return millions of results), and where there is a certain amount of repetition in the terminology and sentence structure used.

The exemplary embodiment provides an easy way to navigate through large and complex manuals, even when the search term(s) used produce many results.

The exemplary navigation tree is generated in response to the user's query. It does not therefore need to be prepared and stored in advance. Any generated navigation tree will include only a portion of the sentences in the knowledge base, making its construction relatively simple. Because, in the exemplary embodiment, the tree is generated only at the time of query refinement and relies only on the content created by the indexing, the manual can be modified, e.g., by adding or deleting sections, without having to reconstruct a navigation tree for the entire manual as is the case with conventional hierarchical systems.

Without intending to limit the scope of the exemplary embodiment, the following example of an application of the method to the printing domain illustrates the operation of the system and method on a graphical user interface embodied in a web browser of a Personal Computer.

EXAMPLE

This example assumes that the knowledge base 58 has been created as described above. The knowledge base can then be used for supporting query specification and search for associated results. A web application server retrieves the content from the indexed knowledge base and provides a web interface to users in order to support the troubleshooting sessions. FIG. 6 shows an exemplary screen 34 of a graphical user interface on a portable troubleshooting tool. The user's query may be entered on a keyboard or keypad (not shown) or through interaction with a table or contents or glossary displayed on the screen. To select specific options, the user may touch the appropriate box on a touch screen or use a cursor control device to place the cursor at the correct place on the screen and select a node, e.g., by pressing the left click of the mouse to expand a node of the list or by pressing a direction arrow on a keyboard. However, it is to be appreciated that the user input device 30, 34 can include suitable device that is capable of inputting a query and highlighting a location in a displayed document.

FIG. 6 shows an example of the tree as it is displayed in the graphical user interface during a troubleshooting session for a user experiencing a paper jam problem with his printer. In this example, the user enters the query "paper jam," which is present in several problem descriptions in the knowledge base. The query is displayed in a display box 500. In the illustrated case, the user query is identified as a whole in some of the problem statement sentences in the knowledge base 58, as indicated to the user in a search option box 512. The options are presented as radio button choices in the search option box. Specifically, the processor 50 has identified 48 responses which include normalized forms of both paper and jam or of expressions which are indexed in the knowledge base as being synonymous with these words. Additionally, as indicated, 224 sentences have been identified which contain a match only of the word paper and 34 sentences have been identified which include a match only of the word jam. The results are divided into sub-queries. Here, the user chooses a result set to explore. However, unless the match is limited to only one word of the query, the best matching result set, i.e., the one reusing the most query words in the most concise expression, is pre-selected as shown in the screenshot in FIG. 6.

In the illustrated case, there is no need for to the user to select a sub-part of the query to widen the search (although a user may subsequently choose to do so if navigation through the tree of complete matches does not yield satisfactory responses).

The result set can be dynamically explored using the tree structure of nodes representing the syntactic units, shown on the left. To limit the tree and to facilitate the choices between branches, the branches have been collapsed into a single branch where only one single sub-branch is available. This is evident in some of the tree nodes displayed, where the node is expanded with several syntactic units, sometimes forming whole sentences.

To facilitate the interaction with the tree, only nodes corresponding to syntactic units found in problem descriptions appear at first. The tree display shows the node "All Problems" and a first level of children nodes that are possible interpretations of the query. The nodes displayed with a plus symbol are nodes containing further levels of children nodes. Nodes with no plus symbol are terminal nodes, such as leaf nodes or nodes collapsed into leaf nodes in the manner previously described.

To access nodes coming from solution text, the user clicks the double arrow button 344 last in the tree. As shown in the screenshot in FIG. 7, this displays any nodes derived from solution text; in the current example the node "clear the paper jams."

If the user selects the node "paper jam" this opens the node, displaying its children nodes, as illustrated in the screen shot in FIG. 7. Selecting a node invokes selecting the problems whose description (or related text) contains the syntactic units corresponding to the node. In the above example, 35 problems out of the previously 48 problems are selected and shown in the results list 342 on the right of the screen. The matching problems are shown in a numbered list, displaying the title of each problem and the sentence matched in the solution text, if the match was generated by such content.

The user can decide to refine the result further by choosing one of the children nodes within the selection. For each selection, the problems matching the syntactic units contained in the path from the root in the tree to the selected node is displayed. Selecting "of the automatic document feeder," for example, selects all matched sentences containing both the unit "paper jams" and the unit "of the automatic document feeder." The problems containing these sentences are displayed, as illustrated in FIG. 8. In the illustrated example, this limits the result set to 4 problems out of the initial 48.

Figure 9:
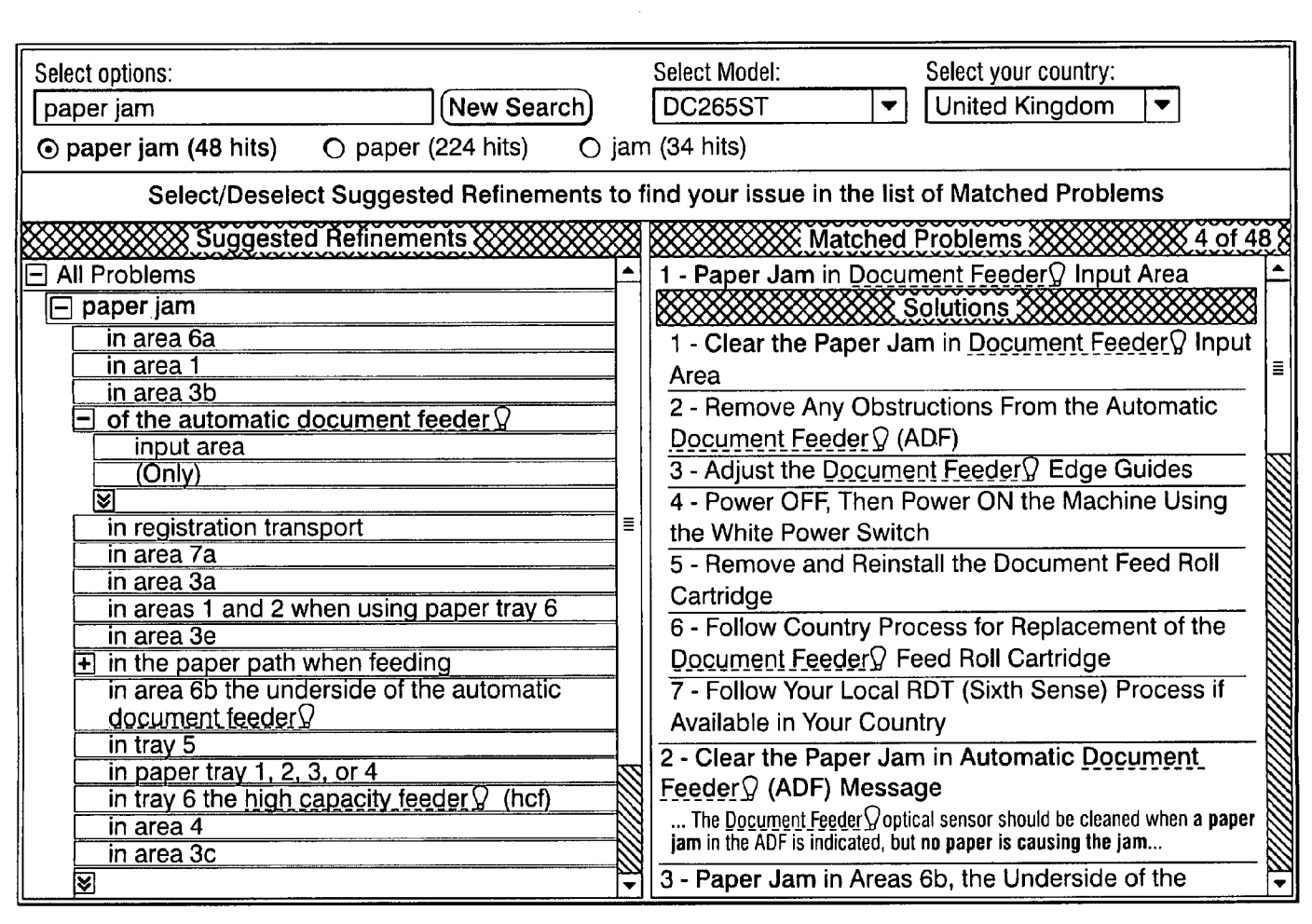

The user can follow this refinement procedure as long as he or she wishes, or at any time choose to consult the results in the result list. If a user clicks on one of the problems displayed in the result list 342, this displays the solutions for this problem (FIG. 9).

The interaction need not follow the sequential order as shown here, since the user may choose to select another node than the currently selected one, and follow another path through the tree to arrive at results.

In user tests of the application described in the Example, it has been observed that the navigation mechanism helped users to identify what they were looking for more effectively than when using a system which only presents the results in a list. The effectiveness may be attributed to the clustering of the results in a comprehensible manner and facilitating users' ability to hone in on their precise concern, by navigation through successive layers in the tree, each level of the tree offering a more precise summary of content than that before.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer retrieval system comprising:
  memory which stores instructions comprising:
    instructions for receiving a user query in a natural language;
    instructions for identifying text strings from an associated knowledge base stored in associated memory, each identified text string in the knowledge base containing at least one expression which is matched with at least one expression of the user query, each text string comprising a sequence of words forming a sentence of a document;

instructions for refining the user query comprising instructions for representing at least a group of the text strings identified from different text documents as a navigation tree in which each of a plurality of selectable nodes comprises a linguistically coherent expression representative of at least one syntactic unit in at least one of the identified text strings and wherein parent-child relationships between syntactic units in text strings in the group of text strings are determined and used in structuring links between the respective nodes of the navigation tree, whereby in navigating the tree, a user is able to select nodes which refine the query by selecting a first node and selecting a second node which is linked to the first node in the tree, the first and second linguistically coherent expressions of the first and second nodes being representative of syntactic units in a same one of the identified text strings; and instructions for retrieving text documents from the knowledge base related to the refined query; and a processor which executes the instructions.

2. The system of claim 1, further comprising a user interface, in communication with the processor, which enables a user to input a user query and navigate the navigation tree.

3. The system of claim 1, wherein the instructions for identifying text strings comprise instructions for identifying a normalized form of at least one expression of the user query.

4. The system of claim 1, wherein the text strings are indexed in the associated knowledge base according to:

normalized forms of words in the text strings, synonyms of at least some of the expressions in the text strings, syntactic units in each of the text strings, and relationships between the syntactic units in each of the text strings.

5. The system of claim 1, wherein the at least one expression which is matched in the knowledge base comprises at least one of:

the same expression as the at least one expression of the user query;

at least one expression whose words' lemma forms are the same as those of the at least one expression of the user query; and a synonym of the at least one expression of the user query.

6. The system of claim 1, wherein the user query describes a problem experienced with a machine, each of the identified text strings comprising at least one of a problem statement and an associated solution sequence for addressing the problem with the machine.

7. The system of claim 1, wherein the instructions for refining the user's query further comprise instructions for presenting subparts of the user's query as alternate queries and for generating a navigation tree based on a user-selected one of the alternate queries.

8. The system of claim 1, wherein the syntactic units are selected from the group consisting of noun phrase chunks, prepositional phrase chunks, adverbial phrase chunks, adjectival phrase chunks, and verbal syntactic units.

9. The system of claim 8, wherein a verbal syntactic unit comprises a finite verb plus any associated auxiliary verbs, infinitive verbs, and adverbs, plus the verb's direct object if any, plus the predicate if the verb is the verb "be."

10. The system of claim 1, wherein a node which would otherwise be a parent node having only one child node branching therefrom comprises an expression which represents syntactic units of the parent node and the child node.

11. The system of claim 1, wherein the relationships comprise syntactic dependency relationships between the syntactic units.

12. The system of claim 1, further comprising memory which stores the knowledge base.

13. The system of claim 1, further comprising instructions for identifying query matches and for ranking the identified query matches according to at least one predetermined ranking criterion, each of the query matches grouping a plurality of the identified text strings which have at least one underlying concept in common.

14. The system of claim 13, wherein the instructions for ranking the query matches include:

instructions for ranking the identified text strings according to at least one of:

the number of words in the user query for which a match is found in the identified text strings; and the number of syntactic units in the identified text strings which match the user query.

15. The system of claim 2, wherein the system is a web-based system and the processor is located on a server and wherein the user interface is remote from the server.

16. The system of claim 2, wherein the user interface comprises a graphical user interface and a web browser.

17. The system of claim 1, wherein the expressions representative of syntactic units serve to group together syntactic units having the same normalized form.

18. A method for retrieving text strings responsive to a user's query comprising:

inputting a query in a natural language;

identifying text strings from a knowledge base, each of the identified text strings comprising at least one expression which is matched with at least one expression of the user query;

for each of at least a group of the identified text strings, determining relationships between syntactic units of the text string;

representing the at least a group of the text strings as a navigation tree in which each of a plurality of user-selectable nodes comprises a linguistically coherent expression representative of at least one syntactic unit in at least one of the identified text strings and wherein the determined relationships between syntactic units are used in structuring links between the nodes of the navigation tree, the linguistically coherent expressions that are representative of syntactic units grouping together syntactic units from different text strings having the same normalized form, and wherein the navigation tree includes nodes as query refinement choices, each refinement choice node comprising a linguistically coherent expression representative of at least one syntactic unit in at least one of the identified text strings which does not match any expressions of the input user query; and retrieving text from the knowledge base related to the nodes selected by a user during navigation of the tree.

19. The method of claim 18, wherein the representing at least a group of the text strings as a navigation tree comprises executing instructions for:

generating a node as the root of the tree that enables selection of all text strings in the group via a pathway linking the root node to a terminal node;

appending child nodes to the root node, each of the child nodes including at least one syntactic unit of at least one query response;

appending further child nodes to the child nodes to represent those syntactic units which, in one of the text strings, are in a parent-child relationship with the syntactic unit of the child node;

recursively appending nodes to previously appended child nodes or further child nodes to represent normalized forms of those remaining syntactic units of the text string; and optionally, thereafter appending a distinguishing node to distinguish two text strings whose pathways are otherwise indistinguishable.

20. The method of claim 18, wherein when a text string includes a plurality of syntactic units, each of which contains an expression which matches an expression of the query, the appending of child nodes to the root node comprises selecting one of the plurality of syntactic units and generating the child node therefrom.

21. The method of claim 18, further comprising presenting subparts of the user's query as alternate refinements and presenting a navigation tree for a selected one of the alternate refinements.

22. The method of claim 21, wherein the presenting of subparts of the user's query as alternate query refinements is presented where none of the retrieved text strings includes normalized forms of all the query words.

23. The method of claim 18, further comprising displaying text related to a retrieved text string which is represented by a pathway navigated by a user through the navigation tree.

24. A computer program product comprising a tangible computer-readable recording medium encoding instructions, which when executed by a processor, performs the method of claim 18.

25. A system for retrieving text responsive to a query comprising:

a knowledge base which stores indexed text strings;

a graphical user interface for inputting a user query and displaying a navigation tree for user navigation of a group of text strings, each of the text strings being retrieved from the knowledge base as responsive to the user query;

a processor in communication with the user interface and the knowledge base which processes the user query and retrieves the text strings from the knowledge base, the processor executing instructions for:

identifying text strings in the knowledge base, wherein each of the identified strings includes at least one expression which matches at least one expression of the user query, the at least one matching expression having the same lemma form as the expression in the user query or being indexed in the knowledge base as being a synonym of the at least one expression in the user query;

identifying syntactic units in each of the retrieved text strings;

representing the identified syntactic units of a plurality of the retrieved text strings in the form of a navigation tree in which a plurality of nodes are connected to a root node, whereby a pathway from a root node to a terminal node of the connected nodes represents one of the retrieved text strings, the nodes of the pathway each representing at least one of the identified syntactic units; and when a user navigates from a root node to a selected one of the connected nodes, displaying text retrieved from the knowledge base which is associated with the pathway.

* * * * *